United States Patent [19]

Goyal

[11] Patent Number: 5,202,985
[45] Date of Patent: Apr. 13, 1993

[54] APPARATUS AND METHOD FOR DISPLAYING DATA COMMUNICATION NETWORK CONFIGURATION AFTER SEARCHING THE NETWORK

[75] Inventor: Praduemn K. Goyal, Ft. Lauderdale, Fla.

[73] Assignee: Racal-Datacom, Inc., Sunrise, Fla.

[21] Appl. No.: 801,320

[22] Filed: Dec. 2, 1991

Related U.S. Application Data

[63] Continuation of Ser. No. 181,538, Apr. 14, 1988, abandoned.

[51] Int. Cl.$^5$ ............................................. G06F 15/40
[52] U.S. Cl. ........................ 395/600; 364/DIG. 2;
364/940; 364/940.61; 364/962; 364/963;
364/974; 364/974.1; 364/974.2; 364/974.4;
364/974.5; 364/974.6; 364/282.1; 364/283.4
[58] Field of Search .................. 364/DIG. 1, DIG. 2;
395/200, 250, 275, 325, 100, 600, 700, 725, 800

[56] References Cited

U.S. PATENT DOCUMENTS

| 4,081,612 | 3/1978 | Hafner | 179/15 |
| 4,385,384 | 5/1983 | Rosbury et al. | 371/22 |
| 4,399,531 | 8/1983 | Grande et al. | 370/60 |
| 4,613,946 | 9/1986 | Forman | 364/518 |
| 4,631,690 | 12/1986 | Corthout et al. | 364/518 |
| 4,644,532 | 2/1987 | George et al. | 370/94 |

OTHER PUBLICATIONS

Winston, P. H., "Examples Involving Search", LISP, pp. 137–154, Addison-Wesley Publishing Co., 1984.
Winston, P. H., "Exploring Alternatives", Artificial Intelligence, pp. 87–136, Addison-Wesley Publishing Co., 1984.
Aho A. V. et al., "Directed Graphs", Data Structures and Algorithms, pp. 198–229, Addison Wesley Publishing Co., 1982.
"Oracle Overview and Introduction to SQL", May 1985, Second Edition, Oracle Corporation.
Knuth, Donald E., "The Art of Computer Programming, Sorting and Searching", vol. 3, Addison-Wesley Publishing Company.
Communications Management Series (CMS) 1000/2000 Operations Guide, Racal Milgo, pp. 3-1 through 3-36 (chapter 3), Mar. 1987.

Primary Examiner—Robert B. Harrell
Attorney, Agent, or Firm—William A. Newton; Jerry A. Miller

[57] ABSTRACT

In a data communication network, a method and apparatus for determining routing in a diagnostic channel utilizes a search token which is passed through nodes of a memory model of the network. The memory model represents nodes as one (or a combination of) object models representing aggregation, deaggregation, mesh or translation operations. By referring to a relational database, selective searches are performed without need to flood the network with search tokens. The search results may be displayed graphically for easier understanding. The method also has general application to a relational database management system by allowing for display of the database relationships and interconnections in a graphical manner for easier interpretation by the user.

11 Claims, 23 Drawing Sheets $\{1,2,3,4\} \rightarrow \{5\}$

AGGREGATION $\{1\} \rightarrow \{2\}$
$\{3\} \rightarrow \{4\}$

TRANSLATION $\{1,2,3,4\} \rightarrow \{1,2,3,4\}$

MESH (STAR)

$\{1\} \rightarrow \{2,3,4,5\}$

DEAGGREGATION $\{1\} \rightarrow \{0\}$

TERMINATION

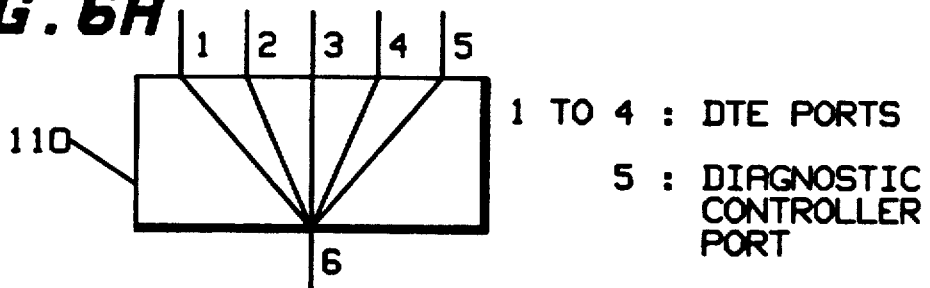
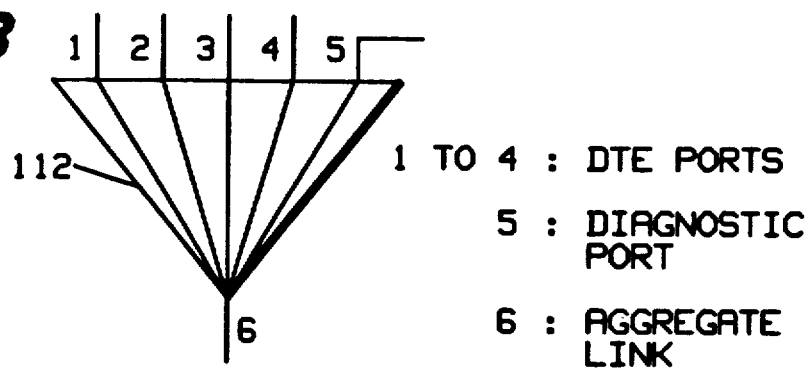
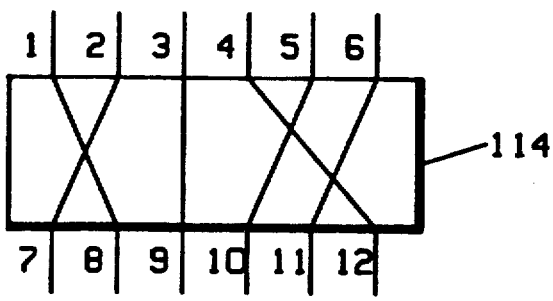

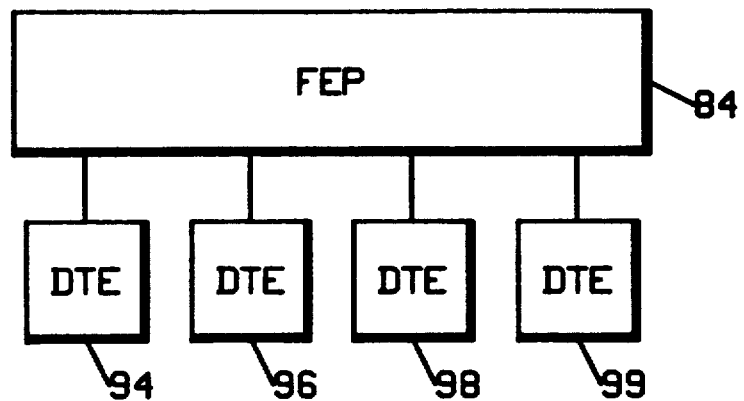
FIG. 21A
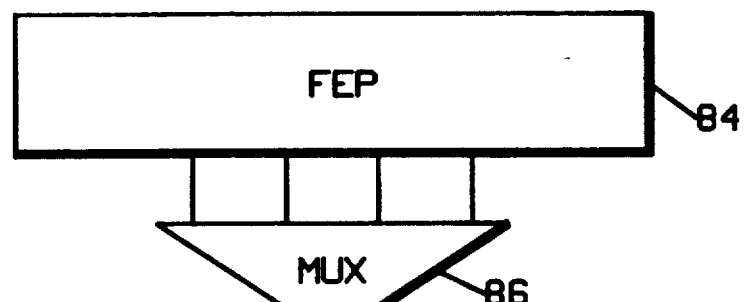
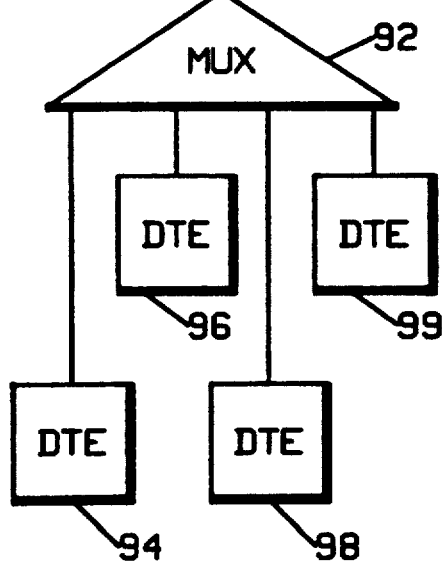
FIG. 21B

APPARATUS AND METHOD FOR DISPLAYING DATA COMMUNICATION NETWORK CONFIGURATION AFTER SEARCHING THE NETWORK

This is a continuation of copending application Ser. No. 07/181,538 filed Apr. 14, 1988 which is hereby incorporated by reference and now abandoned.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

1. Field of the Invention

This invention relates generally to the field of network diagnostic and management systems for communications network and a method and apparatus for displaying the results of database queries. More particularly the present invention relates to a method and device for determining the interconnection topology of a possible dynamic data communication network and for conducting communication between a network controller and the devices being controlled. The invention uses an unique method of querying a database which permits a graphical representation of the query results.

2. Background of the Invention

Relational database software is commercially available and suitable for various database functions where elements of the database are related to one another in some way. For example, such databases may be used to store information about a company's employees. Such information may include structural relationships concerning a person's position within a company's organization such as the person's department name or number, his supervisor, his subordinates, etc. Traditional relational database managers are able to readily produce, for example, a list of all of the people who report to a particular supervisor. Unfortunately, this method of displaying relational information is often not optimal for use by the database user. For example, although such information may provide a complete structural definition of a company's organizational structure, a graphical representation such as the typical organization chart is much more easily digested by the human user.

In an environment more closely akin to the preferred embodiment, it becomes even more evident that the typical database output format is inferior. Consider, for example, a major airline's telecommunication system for data communication used for processing reservations. The network's topology may be stored in a relational database containing entries which are related to one another by their interconnection. However, present relational database management software provides no mechanism for displaying that interconnection in a manner which is easily understood. Such software typically is only able to provide a sorted listing selected entries of the database.

Such a data communications network consists of nodes and links. The nodes are of different types and can offer different services. A node has a set of ports, and a set of time varying mappings are defined between these ports. Nodes are connected to form the network via links. Links connect the external ports of the nodes. The network derives its time varying character by virtue of the switching that takes place in the nodes. The network carries user data in logical pipes called channels. The channels are dynamic and the physical paths followed by the channel can change with time. The channel data flows change as a result of this switching. A multiplicity of channels may be carried by a link.

Each node receives the data on its ports and forwards it on some other port(s) depending on the switching state of the node. Data from a multiplicity of ports may be sent on a single port and vice versa.

For several reasons including network management it is required that network topology and channel flow changes can be represented, displayed, and effected in an efficient manner. In particular it is required from the network management perspective to effect configuration and switching changes, run diagnostic tests on the nodes and links and to receive unsolicited information regarding the spontaneous activity in the network. Several management entities can simultaneously control the network. In such complex networks, it is also desirable to be able to display selected portions or views of the network in a graphical manner which is better digested by the user.

U.S. Pat. No. 4,613,946 to Forman describes a method and apparatus for generating hierarchical displays. But, only the entire tree, or the entire portion of a tree beginning at a selected root node may be selected for display.

Hitherto, in literature several search techniques have been proposed. Examples include Winston, P.H."Examples Involving Search", LISP, pp. 137-154, Addison-Wesley Publishing Co., 1984; Winston, P.H., "Exploring Alternatives", Artificial Intelligence, pp. 87-136, Addison-Wesley Publishing Co., 1984; and Aho A.V. et at., "Directed Graphs", Data Structures and Algorithms, pp. 198-229 Addison Wesley Publishing Co., 1982. However, these techniques use a model of the node where input on any port can go out on any other port. No attempt is made to model the internal characteristics of the node. Furthermore the time varying aspect of the internal switchings is not modelled.

There are elegant algorithms for directed tree searches, but in absence of internal node modelling, flood routing such as described in U.S. Pat. No. 4,399,531 to Grande et al. seems to be the norm for searching in undirected graphs.

Since different networks have different characteristics, an efficient and generic method is needed to handle all the various network types uniformly in order to:
  determine the configuration topology based on services and channels;
  determine routing between two nodes;
  search the management entity controlling the node (management entity can change dynamically);
  determine channels carried by the node; and
  search for different services and node types.

A model for connectivity of these objects is needed and a search algorithm is also needed for obtaining routes and views of the connectivity of the network. The search algorithm should be capable of tracing logical connection pathways referred to here as channels in an efficient manner by pruning the undesired pathways.

The present invention satisfies these needs by utilizing a mechanism for modelling the internal switchings of a node as well as routing mechanisms to perform efficient searches in face of time varying dynamic behavior of the network, which is a characteristic of most data communication networks.

The present invention also provides a mechanism to display graphically a representation of a relational database and provides a mechanism for searching a complex computer network for a particular device within the network so that control over that device may be effected by a network controller. The search is conducted in an efficient manner which relies upon a network model which may simulate any element in a communication network.

SUMMARY OF THE INVENTION

It is an object of the present invention to provide an improved system for performing network diagnostics and maintenance in a complex data communication network.

It is an advantage of the present invention that a selective graphical representation of the contents of a relational database can be obtained.

It is an advantage of the present invention that portions of a data communications network may be viewed in a graphical representation.

It is another advantage of the present invention that by keeping track of aggregations which have been traversed in the search, the necessity of exploring all paths as in flooding can be avoided by exploring only deaggregations that have previously undergone aggregations.

Another advantage is obtained by identifying the global search context and separating it allowing the search token to carry only needed unique information and referencing the global context merely by pointing to it. This reduces the size of the search tokens which are replicated as the search proceeds.

It is a further advantage of the present invention to provide an efficient mechanism for determining a network's topology and for finding a particular device within a network.

These and other objects and advantages of the invention will become apparent to those skilled in the art upon consideration of the following description of the invention.

In one embodiment of the present invention, a method for providing a response to a query of a relational database, includes the steps of searching the database for entries which satisfy a search criterion; ascertaining a structural interrelationship between the entries which satisfy the search criterion; and generating a representation of the interrelationship between the entries which satisfy the search criterion, the representation being capable of conversion to a graphical representation of the structural interrelationship.

An apparatus, according to one embodiment of the present invention, for displaying a selected portion of information from a database includes a searching mechanism for searching the database for entries which satisfy a search criterion. An ascertaining mechanism ascertains a structural interrelationship between the entries which satisfy the search criterion. A generating mechanism generates a graphical representation of the interrelationship between the entries which satisfy the search criterion.

In another embodiment of the invention, a method of displaying a graphical representation of a selected portion of a network includes the steps of establishing a search criterion for selecting the portion of the network; conducting a search of the network for objects which meet the search criterion; storing selected information relating to the interconnection of objects within the network which meet the search criterion; and displaying a graphical representation of the interconnection of the objects.

Another method according to the present invention of searching a computer network for nodes satisfying a predetermined search criterion includes the steps of generating a token including a search criterion; placing the token on a first port of a node; determining whether or not the node has characteristics which satisfy the search criterion; transforming the token to a second port in accordance with a stored internal switch mapping which describes how the node's ports are mapped to one another; moving the token to an externally connected node using a stored external connection mapping which describes how the node is interconnected with other nodes; and recording a list of the nodes traversed as by the above steps which satisfy the search criterion.

In an embodiment of a routing manager for a diagnostics and control system for a communications network comprising interconnected nodes according to the present invention, the routing manager includes a relational database management system including a database containing information relating the nodes of the network to one another. Searching means are provided for conducting a search of the database for nodes satisfying a search criterion. A display displays an abstraction of a selected portion of the network based upon which of the nodes satisfy the search criterion.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 6A shows a model of a multiport modem.

FIG. 6B shows a model of a multiplexer.

FIG. 6C shows a model of a matrix switch.

FIG. 21A shows a first abstraction of the network of FIG. 4.

FIG. 21B shows a second abstraction of the network of FIG. 4.

DETAILED DESCRIPTION OF THE INVENTION

For purposes of this document, the terms 'nodes' and 'devices' are used synonymously. The term 'Relational Database Manager' or 'Relational Database Management System' or 'RDBMS' refer synonymously to a system which stores elements of information which contain relationships to other elements of information. Typically, such information is stored as a table but this is not to be limiting since other mechanisms may be utilized.

Figure 1:
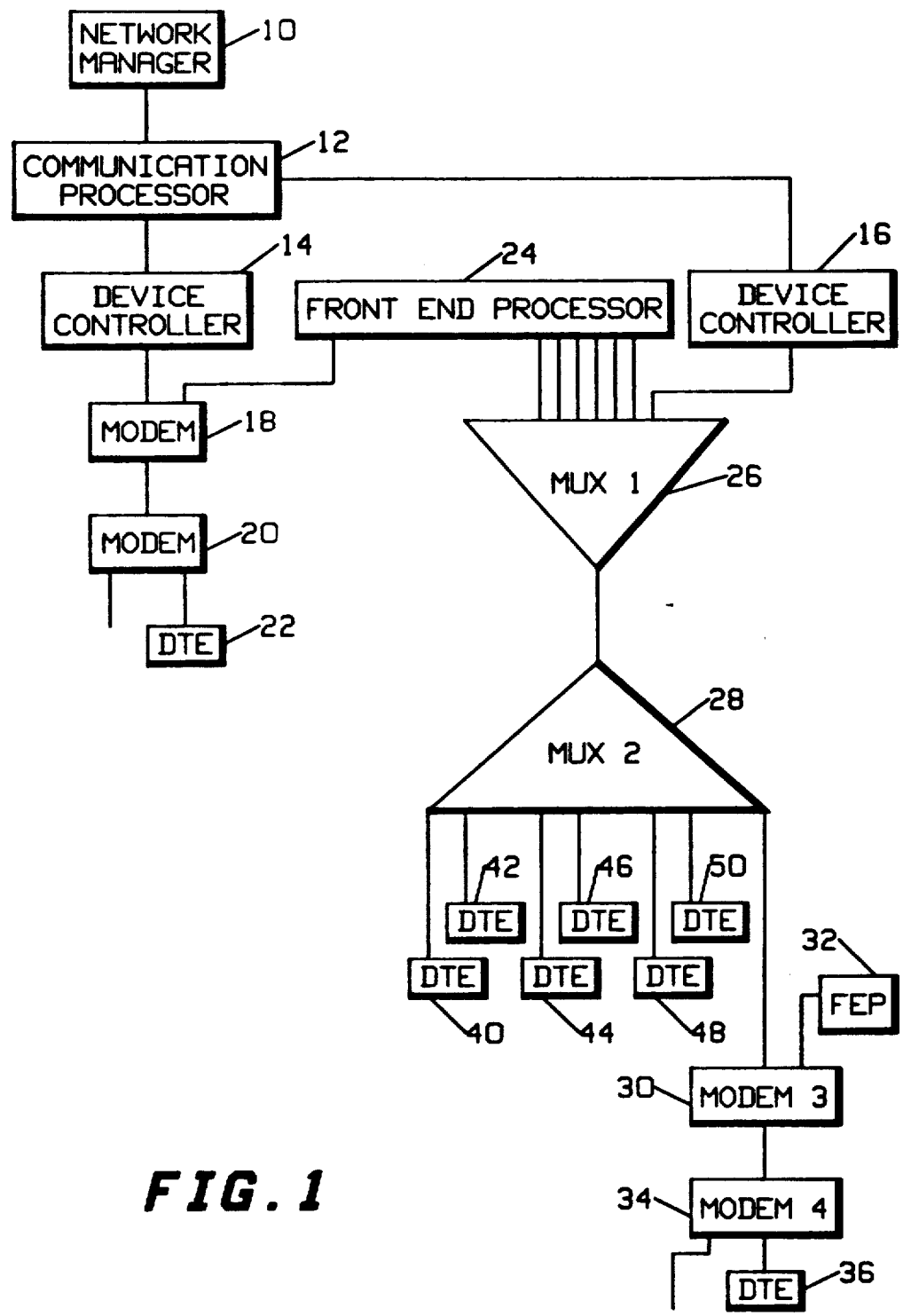
FIG. 1 is a diagram of a small portion of a communications network using the present invention.

Turning now to FIG. 1, an example communication network is shown from the perspective of the network management and diagnostic system. In this network, a network manager 10 is coupled to a communication processor 12 which is in turn coupled to a pair of device controllers 14 and 16. Device controller 14 is coupled to a modem 18 to communicate diagnostic data and modem 18 is communicating with a modem 20. Modem 20 is coupled to a DTE (Data Terminal Equipment) at one port and to other network components (not shown) at a second port). A Front End Processor (FEP) 24 is coupled to modem 18 for main channel data as well as several ports of a multiplexer (MUX, actually a multiplexer/demultiplexer) 26. The second device controller 16 is also coupled to one of the multiplexer ports of multiplexer 26. The aggregate output of multiplexer 26 is coupled to a second multiplexer 28. One of the ports of multiplexer 28 is coupled to a modem 30 which may be coupled to a second front end processor 32. Modem 30 communicates with a modem 34 which has one port connected to a DTE 36 and another port connected to other network components. Other ports of multiplexer 28 are coupled to DTE devices 40, 42, 44, 46, 48 and 50. Of course, this example network is intended only as an illustration of a portion of a typical communications network which may include hundreds or thousands of modems, multiplexers, etc.

Such communication networks are assembled from of modems, multiplexers, concentrators, and switches. The network topology connecting these devices is based on user implementation and could vary considerably. The network management system controls these devices by means of diagnostic channels which are usually multiplexed in some manner with the user data. This can be accomplished by using a low speed FSK side channel which is frequency division multiplexed with the main channel data or by allocating slots for diagnostic data in a multiplexer's data frame or other similar techniques. The diagnostic channels originate from Device Controllers (DC). The devices carry user data in addition to diagnostic data. The user data channels originate from the Front End Processors (FEP's). A typical network as shown in FIG. 1 includes such components. The network topology is stored in a database according to the present invention and updated as necessary to reflect connectivity changes such as additions or reconfigurations of the network.

Communication between the Network Manager (NM) and the device is a hierarchical process. The Network Manager 10 communicates with Device Controllers (DC) 14 and 16 which in turn control the devices. The NM 'knows' the connectivity to the device (which devices are connected to which) from its database, but the identity of the DC is not known. This is because the assignment of the DC to a device changes dynamically based on the switching function of the device itself and intervening devices. So, it is required to determine this by querying the database. This query is conducted selectively, i.e., only with respect to the diagnostic channel.

Figure 2:
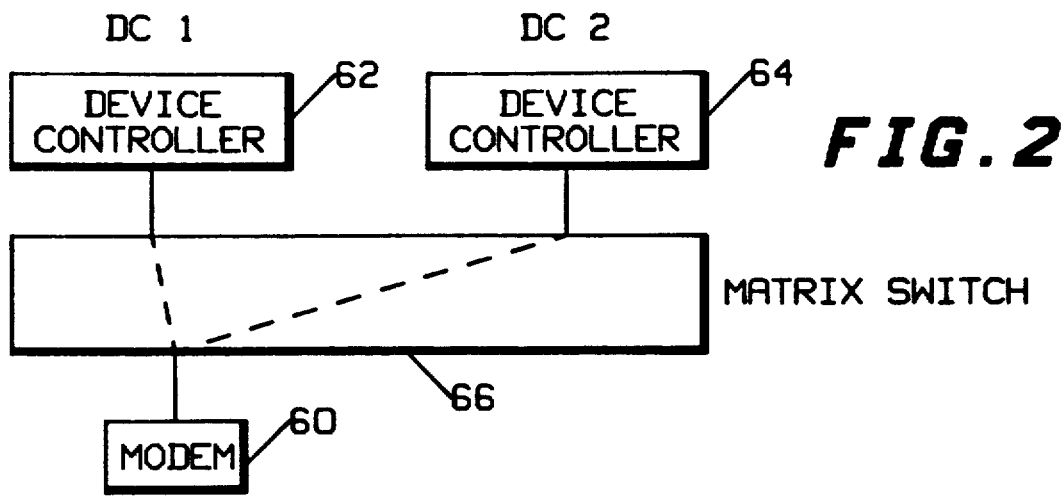
FIG. 2 illustrates a device which may be controlled by two device controllers.

In a network such as that of FIG. 1, it is not unusual for one device to be controlled by several device controllers as illustrated in FIG. 2. In this figure, a modem 60 is controlled by either device controller 62 or 64 depending upon the position of matrix switch 66.

Parallel activity may be permitted in network over the same channel, and therefore in order to allocate resources with the intent of avoiding collisions, topological orientation of the device with respect to other devices on the diagnostic channel is needed. This is accomplished by conducting searches on the diagnostic channel to find the upstream, downstream and codevices (devices that are on the same diagnostic tier).

A port on a device can carry a multiplicity of channels by virtue of aggregations at the device itself, or aggregations in the preceding devices. It is desirable to find the individual channels that are carried by the port at a given time. In order to accomplish this goal, searches are conducted until the aggregations have been deaggregated and the channel termination points (such as TNPs, DTEs and FEPs) have been reached in the search.

Figure 3:
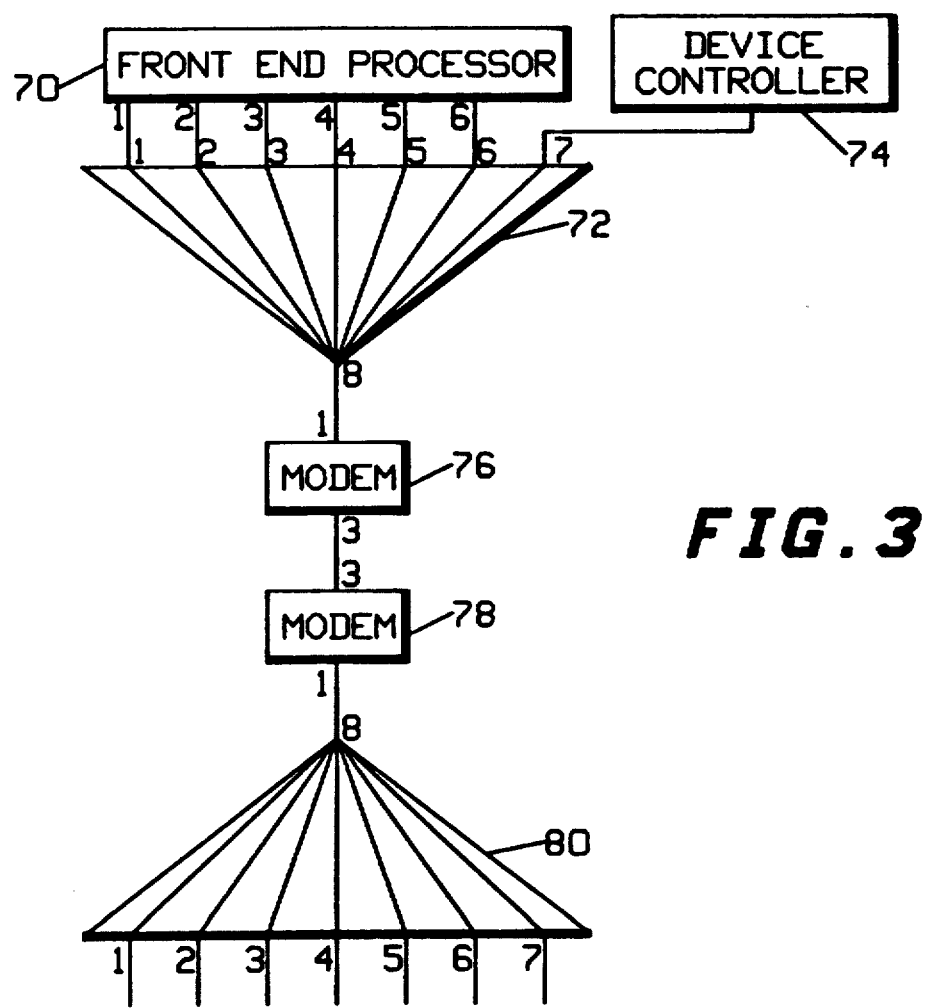
FIG. 3 illustrates channel flow determination.

Turning now to FIG. 3, an example illustrating channel flow determination is shown in a portion of an example network including a front end processor 70 coupled to six ports of a multiplexer 72 with a device controller 74 connected to a seventh port of multiplexer 72. The aggregate channel from the multiplexer 72 is communicated by a modem 76 with a modem 78 to a multiplexer 80. For example, determine the channel flow on port 6 of mux 80, port 6 is traversed internally through the mux 80 to port 8 of the mux which in turn travels through the modems 78 and 76 to mux 72 port 8. Port 8 is then internally traversed to port 6 and then to port 6 of the FEP 70. This gives us the required solution for this example.

In order to find a route between two devices a search is conducted from the given device on the specified port until the target device is found. In conducting the search, it is not necessary to resort to flood routing which can be combinatorially explosive and consumes a great deal of overhead. Rather, the present invention takes advantage of the port mapping information in the internal switchings of the node to limit the scope of the search.

Sometimes it may be desired to find a particular type of device closest to a given device. The search is then conducted as usual but is terminated as soon as the given device type is found. For example in FIG. 3 one may want to determine the multiplexer closest to multiplexer 80. In this case the search will go through the modems 76 and 78 and find that it is multiplexer 72.

Of course, the actual searches are performed on the network model stored in the network manager in the form of the memory map of the network and/or the database information stored on disk, but this is not to be limiting since the search could also be performed on the actual network if desired in other embodiments.

The network topology is stored in the network manager's database. The changes in the network topology resulting from switching, and connection changes must be reflected in the database to perform the routing correctly. These changes are localized to the devices in which they occurred and do not produce ripple effects. This is achieved by storing only the local and minimal information with each device.

Turning now to FIG. 4, an analogy of the network abstraction to the OSI model is shown. In this example, FIG. 4a shows that an FEP 84 is coupled to a multiplexer 86 which communicates via modems 88 and 90 with multiplexer 92 which is coupled to a plurality of DTE devices 94, 96, 98 and 99. This communication hierarchy is analogous to the layered communication model known as the OSI (Open System Interconnection) model as illustrated in FIG. 4b, 4c, 4d and 4e wherein communication between FEP 84 and a DTE are carried out through mux 86 and mux 92 with the lower level communication of data bits carried out by modems 88 and 90.

As mentioned above, it is often desirable or necessary to obtain different views of the network based on the characteristics of the devices. The network can be abstracted at several different levels according to the present invention. This is analogous to the layered OSI model as shown in FIG. 4. On the highest level one can view the network to be a connection between FEP's and DTE's treating all the intervening devices transparent. On a lower level, muxes can be viewed but modems carrying the mux aggregate links may be deemed transparent. At the lowest level all the devices may be visible. Other abstractions are also possible.

Any of the devices forming a network such as that forming the network of FIG. 1 may be modeled according to the present invention as one of the model devices of FIG. 5. The aggregation mapping object 100 of FIG. 5a is used to model a device in which a plurality of ports map to a single port or vice versa such as a multiplexer or demultiplexer (usually collectively referred to herein as a multiplexer). A translation object 102 as shown in FIG. 5b is used where a single port maps to another single port such as a single port modem, a digital service unit, an encrypter, etc. The mesh object 104 of FIG. 5c is used to represent devices wherein any port may be mapped to any other port such as a packet switching node. FIG. 5d represents a deaggregation object which is simply the opposite of an aggregation. FIG. 5e represents a termination object which represents an end point such as a DTE. Terminations are also referred to herein as a leaf. These objects may be used singly or in combination to represent any device in a communication network. Several instances of mappings may be used in layers or other combinations to represent more complex devices. For example, FIG. 5f shows a more complex internal mapping represented by a combination of the basic mappings involving two aggregations and one translation.

Devices are represented in an abstract form as a "generalized object". The generalized object model is used here to build a network model. The object model generalizes the concept of a device to include all device types and operations. The generalized object model provides an uniform view of all devices regardless of their type and function.

The generalized object is comprised of a set of ports further classified in two sets: external ports, and internal ports. The external ports are the means by which an object connects to other objects in the network. Internal ports are means to characterize the switching nature of the object.

Internal switching mapping is the description of switching performed by the object. In other words it is the mapping of an object's set of external and internal ports onto itself. Several basic types of switching functions have been identified and shown in FIG. 5. An object may use one or all of these switching functions as well as many instances of them in mapping its ports.

The aggregation type of switching mapping maps a multiplicity of an objects internal and/or external port to a single external or internal port. The deaggregation type performs the opposite function. (A broadcast function may also be defined as a deaggregation type function which does not have a corresponding aggregation.) The translation type of switching mapping, maps an individual external or internal port to an individual external or internal port. The mesh or star type of switching mapping models a type of connection wherein every port in the star connection maps to every other port in the same star connection set.

Examples of these objects representing network components are shown in FIG. 6. FIG. 6a shows a multiport modem 110 with 4 DTE ports and a diagnostic controller port modeled as an aggregation object. FIG. 6b shows a multiplexer 112 having 4 DTE ports and a diagnostic port modeled as an aggregation object. FIG. 6c shows a matrix switch 114 modeled as a translation object. The generalized objects are connected to depict an abstract form of the network. These connections (links) are represented by external connection structures. External connection structure is the description of the connections of an object to other objects via the external ports. In other words it is the mapping of an object's external ports to the external ports of a multiplicity of other objects.

Figure 7:
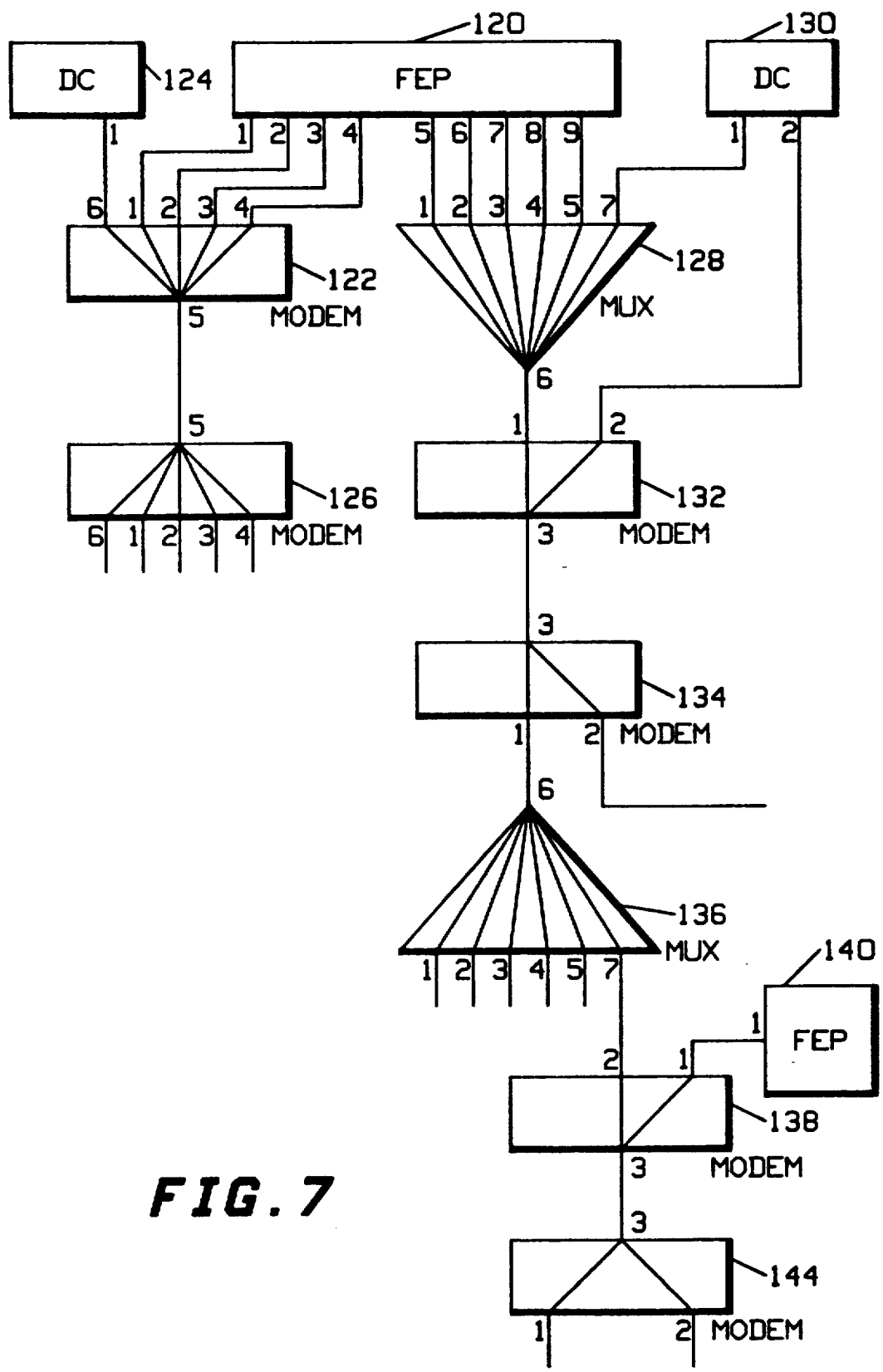
FIG. 7 shows a generalized object representation of the network of a network.

Turning now to FIG. 7, a network is modeled as described above using the object representation. A front end processor 120 has four ports coupled to a multi-port modem 122 which also has a port coupled to device controller 124. All ports of the FEP 120 are internally terminated (leaf). Modem 122 is modeled as an aggregation as is its corresponding multi-port modem 126 with which it communicates. FEP 120 also has a plurality of ports coupled to a multiplexer 128 also modeled as an aggregation object which is also coupled to a device controller 130. The aggregated port of 128 is coupled to a modem 132 which is modeled as an aggregation object. Modem 132 is coupled to a modem 134 which is modeled as an aggregation object. Modem 134 is coupled to a multiplexer 136 which is modeled as an aggregation object. A port of multiplexer 136 is coupled to a modem 138 which is also coupled to FEP 140. Modem 138 is modeled as an aggregation object. Modem 138 communicates with modem 144 which is also modeled as an aggregation object.

Mesh objects may be used to model objects when there is no knowledge of the internal mapping.

FIG. 7 shows another example network represented in the form of generalized objects and external connection structures. All the problems identified above, need a search mechanism. This mechanism uses a single algorithm, which operates on different parameters to solve the different problems identified. A few definitions are listed below:

Search—A search is defined to be the traversal of the objects in the network graph according to some criteria. The representation mechanism in the search algorithm is a search token. A search is thus a restricted flow of tokens in the network or network model.

Search Token—A search token specifies the object, port, and the extent that is to be searched and it points to a search context (defined below). The token also carries with it the history of every aggregation until the time every aggregation is balanced by a corresponding deaggregation in the search path. The search token specifies the pathways and objects that are to be traversed. The search is completely specified by a list of search tokens.

Search Context (Search Criterion)— There is also some global context in which the search is to be undertaken. This context specifies which of the objects that are encountered in the process of searching are to be remembered, when the search is to be stopped, direction and view in which the search is undertaken. In general, this can relate to any of the attributes of the nodes or there connectivity and may be similar or identical to the types of criteria generally searchable in a relational database.

Transcription— The process by which a token notes which nodes have been visited which satisfy the search criterion.

The search in the above framework can be thought of as a restricted flow of search tokens in the network graph. An object receives a search token on one of its external ports and operates upon it with the translation, aggregation, deaggregation and star operations possibly many times until the token(s) appear on its external port(s). It then forwards the resulting search token(s) to the multiplicity of the objects connected to this object by its external ports.

As the search tokens flow through the graph, the token list is updated with the resulting tokens. As the tokens flow in the network graph the visited objects which meet the search context are remembered (transcripted) in another list called search list, if it is required by this token's search context. A token is removed from the token list if the object that it refers to does not present any connections or if the end condition for this token has been met.

A search is said to be completed when either the token list has become empty in which case there is nothing more to be searched or the end condition for the search specified by the search context has been met in which case remaining tokens need not be pursued.

The order in which search token are explored would identify the order of search: depth first, or breadth first etc. In the present embodiment, breadth first is used but this is not to be limiting.

In the given example, devices are identified by addresses. For this solution, a relational database has been assumed, but other types of databases can also be used. Two relations are defined, one for external connections, and one for internal switching. External connection relation has the following form:

[Device ID, Device Port, Connected Device ID, Connected Device Port].

Device ID: is the address of the device being defined.

Device Port: refers to a particular external port # in this device.

Connected Device ID (CID): refers to the address of the device connected to port defined by 'Device Port'.

Connected Device Port (CDP): is the port number of the CID, connected to the Device Port.

Table 1 shows as an example the external connection table entries for device 122 of FIG. 7.

The internal switching table has the following form: [device ID, Source Port ID, Sink Port ID, Mapping & Port Characteristics]

Device ID: is the address of the device being defined.

Source Port: Port # of the port being aggregated.

Sink Port: Port # of the aggregate port.

Mapping and Port Characteristics (MAPC): This identifies the type of mapping (translation, aggregation, and mesh) as well as the port characteristics (such as diagnostic, external, internal, etc.).

It should be noted that the Source and Sink port definitions apply both to internal as well as external ports. Also, the concept of Sink and Source ports refer only to operations that perform aggregation and deaggregation. In translation and mesh operations the Source and Sink ports have no significance and are interchangeable.

Table 2 shows for example the internal switching entries for device 122 of FIG. 7.

TABLE 1

| EXTERNAL CONNECTION ENTRIES FOR DEVICE 122 | | | |
|---|---|---|---|
| DEVICE ID | PORT | CNCT | CNC PORT |
| 122 | 6 | 124 | 1 |
| 122 | 1 | 120 | 1 |

TABLE 1-continued

EXTERNAL CONNECTION ENTRIES FOR DEVICE 122

| DEVICE ID | PORT | CNCT | CNC PORT |
|---|---|---|---|
| 122 | 2 | 120 | 2 |
| 122 | 3 | 120 | 3 |
| 122 | 4 | 120 | 4 |
| 122 | 5 | 126 | 5 |

TABLE 2

INTERNAL SWITCHING ENTRIES FOR DEVICE 122

| DEVICE ID | SRC-PORT | SNK-PORT | MAPPING TYPE |
|---|---|---|---|
| 122 | 6 | 5 | diag, agg |
| 122 | 1 | 5 | main, agg |
| 122 | 2 | 5 | main, agg |
| 122 | 3 | 5 | main, agg |
| 122 | 4 | 5 | main, agg |

Figure 8:
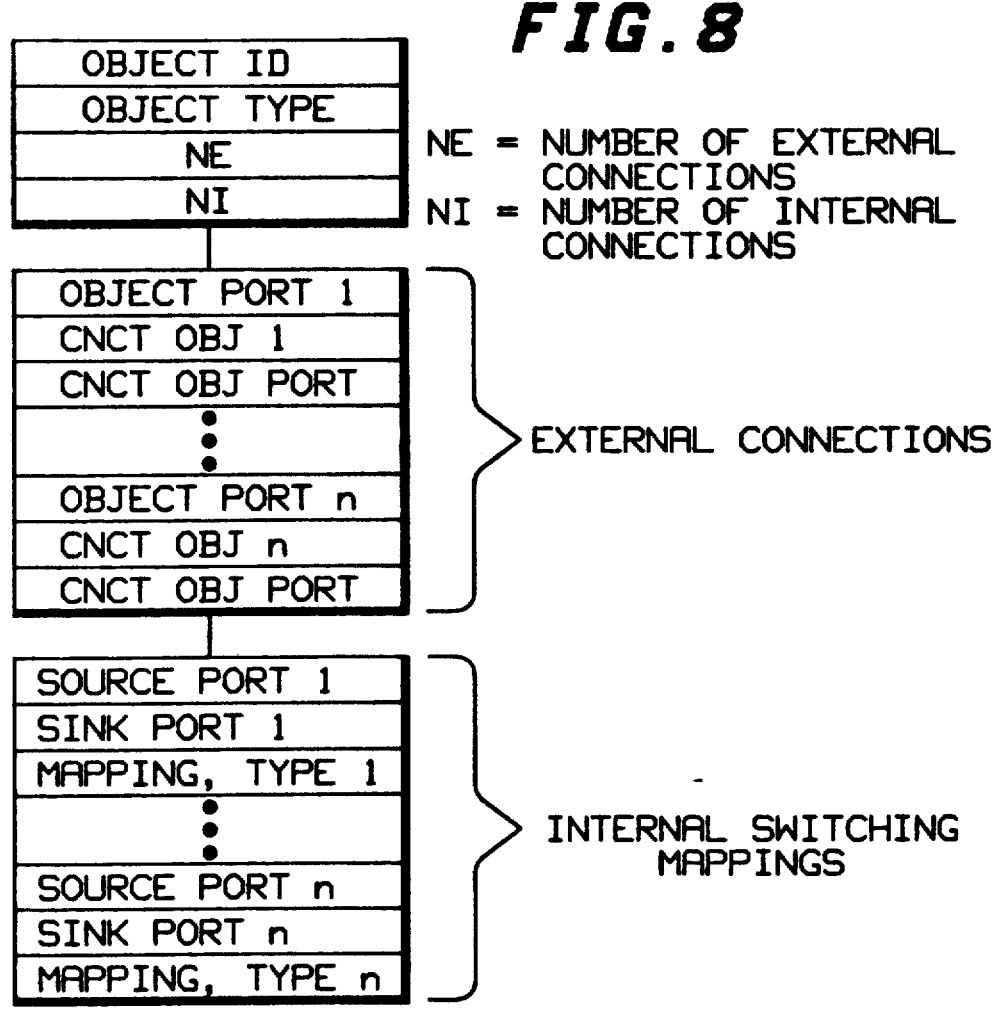
FIG. 8 shows the object data structure of the present invention.

Data Structures for object representation consists of two parts, viz., a fixed part and a variable part. The fixed part has information about the object such as its address, characteristics, and length information for the variable part. The variable part contains the external connections and internal switchings as well a as a list of diagnostic source ports. FIG. 8 shows the object data structure. It should be emphasized that the connectivity information that is stored for each device is localized.

By tracing the connection from a device to its neighbors and repeating this process recursively on the neighbors, the network connectivity is obtained. The Search method, and the principle of search tokens has been defined to achieve the connectivity information.

Figure 9:
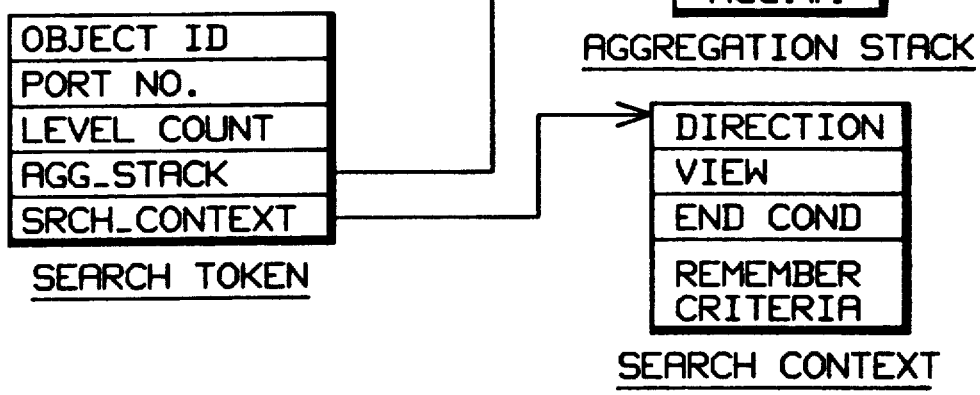
FIG. 9 shows the search token data structure of the present invention.

The data structures for the search token, and related data structures are shown FIG. 9. Object ID and port number locate a token definitively in the network. As the search continues and tokens flow, these two fields are updated. The level count is initially set to the number of levels to which search is to be undertaken. At each transcripted object traversed, it is decremented by one.

To help keep track of the search process, an aggregation stack associated with each token is maintained in memory. This aggregate stack is a memory of aggregations that have been passed through so far without deaggregation. The search context (a global structure) abstracts the token independent search criteria (end condition, remember criterion, etc.) and global search information (direction, view, etc.).

Figure 10A:
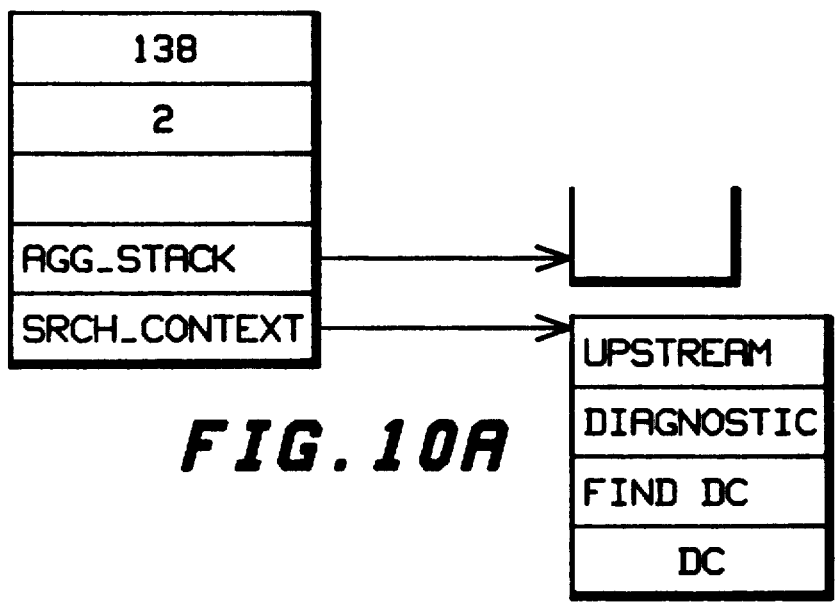
FIG. 10A represents an initial token generation.
Figure 10B:
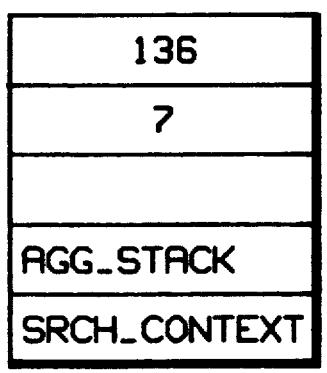
FIG. 10B represents a first modification of the token.
Figure 10C:
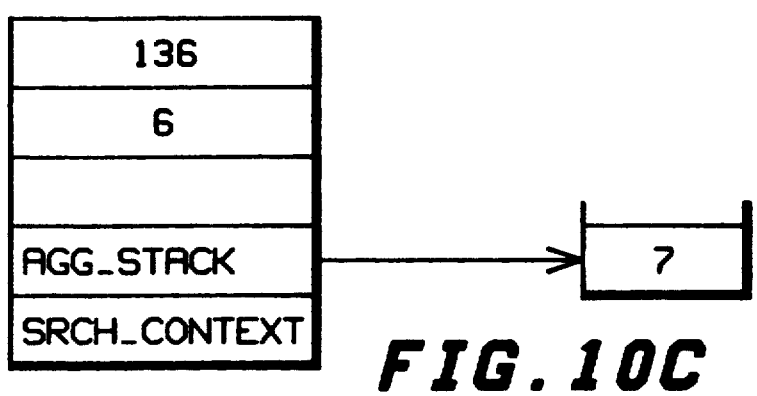
FIG. 10C represents a second modification of the token.

By way of example of the search process, to find the DC of device (modem) 138 of FIG. 7, the search process begins by locating the diagnostic source port by referring to the Mapping and Port Characteristics field in the Internal Switching Port table of device 138. An initial token is generated on this port. The token is as in FIG. 10a. Now the external connection table of device 138 is searched, and the device (and its external port) connected to the port referred to by the token is determined. Next the initial token is transformed with its device ID changed to the connected device id, and its port number is changed to the connected port number, and this operation can be thought of as passing the token from device 138 to device 136. The modified token is shown in FIG. 10b. Now, the internal mapping for device 136 are searched, and the sink port corresponding to the source port in the token is identified. This leads us to external port 6 of device 136. Furthermore, this operation is identified to be an aggregation operation, therefore port 7 is pushed on an aggregation stack associated with this token. The port field of the token is changed to port 6. This operation can be though of as passing the token from port 7 to port 6 of device 136. FIG. 10c depicts the token at this stage. Now, as before, the external connection is searched, and the token is passed to device 134. The token is passed internal in device 134 and then onto device 132 externally, and then to device 128. Here on examining the internal switching mapping, the deaggregation operation is identified, and the aggregation stack is popped and we emerge on port 7. The external mapping of port 7 in device 128 is found to be connected to a DC (DC 130). This DC 130 is the DC assigned to control device 138. The algorithm presented in its general pseudocode form looks like:

```
procedure search
begin
    while ((token list is not empty) or (search
    terminating condition is not met))
    begin
        for (each token)
        begin
            transform token on incoming ports by internal
            switching mappings into tokens on the outgoing
            ports;
            move outgoing tokens to the externally connected
            objects using external connection mapping;
        end for
    end while
end procedure
```

The end condition for determining the DC of a device is finding the DC itself. It should be noted that the end condition is met on a token-by-token basis in most cases. That is if the search is being carried out for multiple tokens (or multiple offsprings of a single initial token), then each token will continue to flow until its end condition is met.

For routing determination, the end condition is the device ID of the device to which the route is sought.

Finally, the search for a unit type is accomplished by setting the end condition as the device type being sought.

It is also possible to remember the path traversed based on a prespecified criteria. This criteria can be a specific channel type, object type, port type etc. As an example, while traversing the network, if the criteria is 'muxes', then the connectivity of the muxes will be obtained, and other devices will be treated transparently. This is the principle used for obtaining different abstractions of the network.

The same process is used to find channels by specified a different criteria, viz., remember where DC or FEP are found for diagnostic and main data channel respectively, as an example.

This process (the search and the representation of devices and channels) can be applied to ANY network, having ANY type of device, as long as they can be modeled by the basic operations defined, and having any channel characteristics.

Figure 11:
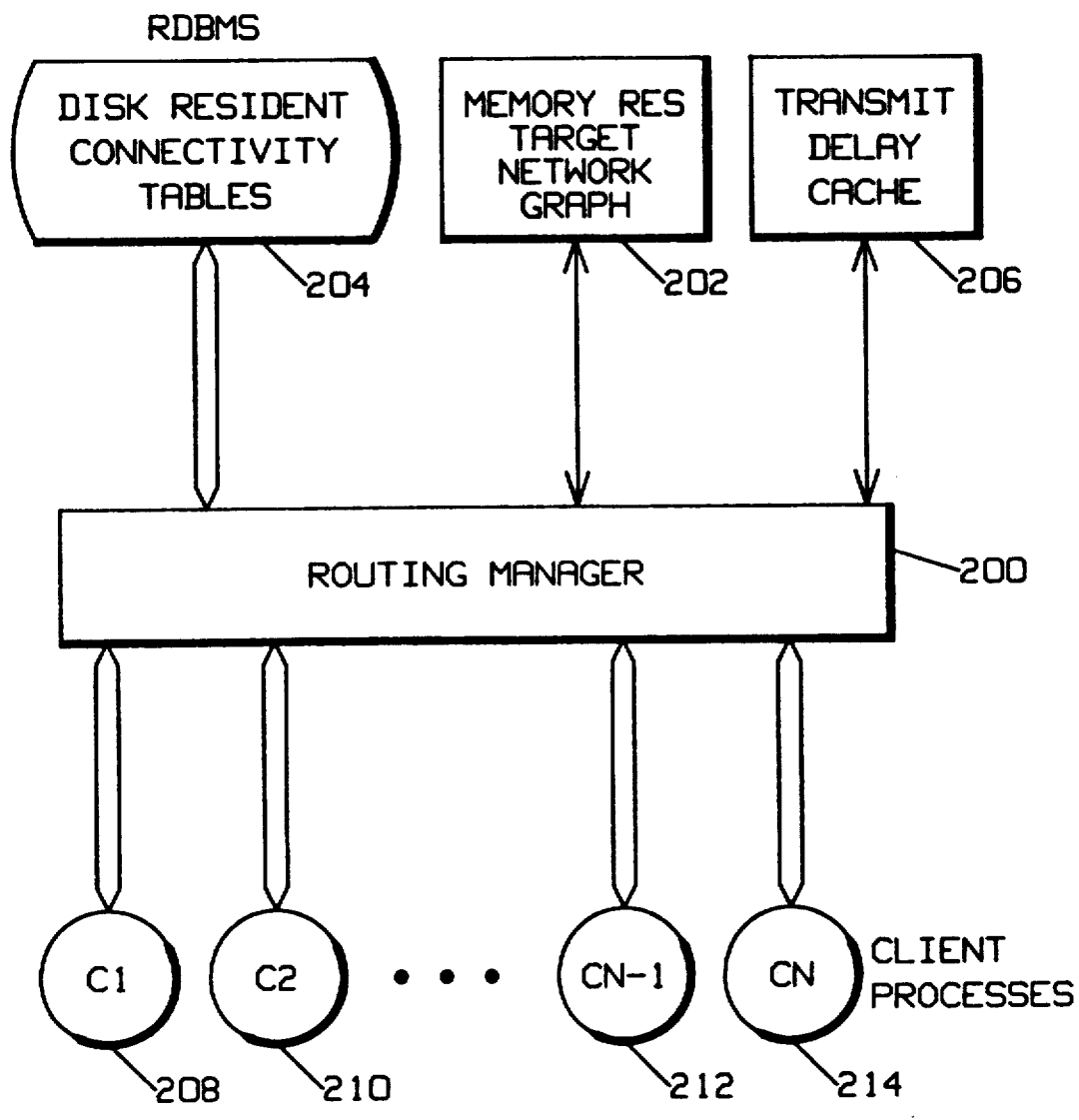
FIG. 11 is a diagram of the routing manager interface to other processes of the present network controller.

Turning now to FIG. 11, the routing manager's interface to the network management system is shown wherein the routing manager 200 accesses local memory 202 for a memory resident target network graph 202 if available. This graph 202 is somewhat like a cache in operation in that the database is available in disk resident connectivity tables of the relational database management system 204 if not available in graph 202. In fact, if memory is unavailable or speed is of little consequence, graph 202 may be viewed as optional for purposes of the search process. A transmit delay cache 206 is available via local memory access to provide the function of calculating route delay. The disk resident connectivity tables are accessed as a remote process. Other client processes such as network applications (transaction control processes, interprocessor communication management, processes, etc.), alarm management, etc. illustrated as client processes 208, 210, 212 and 214 are available also as remote processes. A remote process is defined as a process which is carried out by a remote processor. This can be carried out using any suitable interprocessor communication technique such as those provided by the operating system. For example, Unix ™ System V message passing, shared mailbox or other interprocessor communication techniques used for multiprocess, multiuser operating system.

In the preferred embodiment, the ORACLE ® Relational Database Management System (RDBMS) by Oracle Corporation is utilized, but this is not to be limiting since numerous other RDBMS products are commercially available and may be suitable for use in the present invention.

Figure 12:
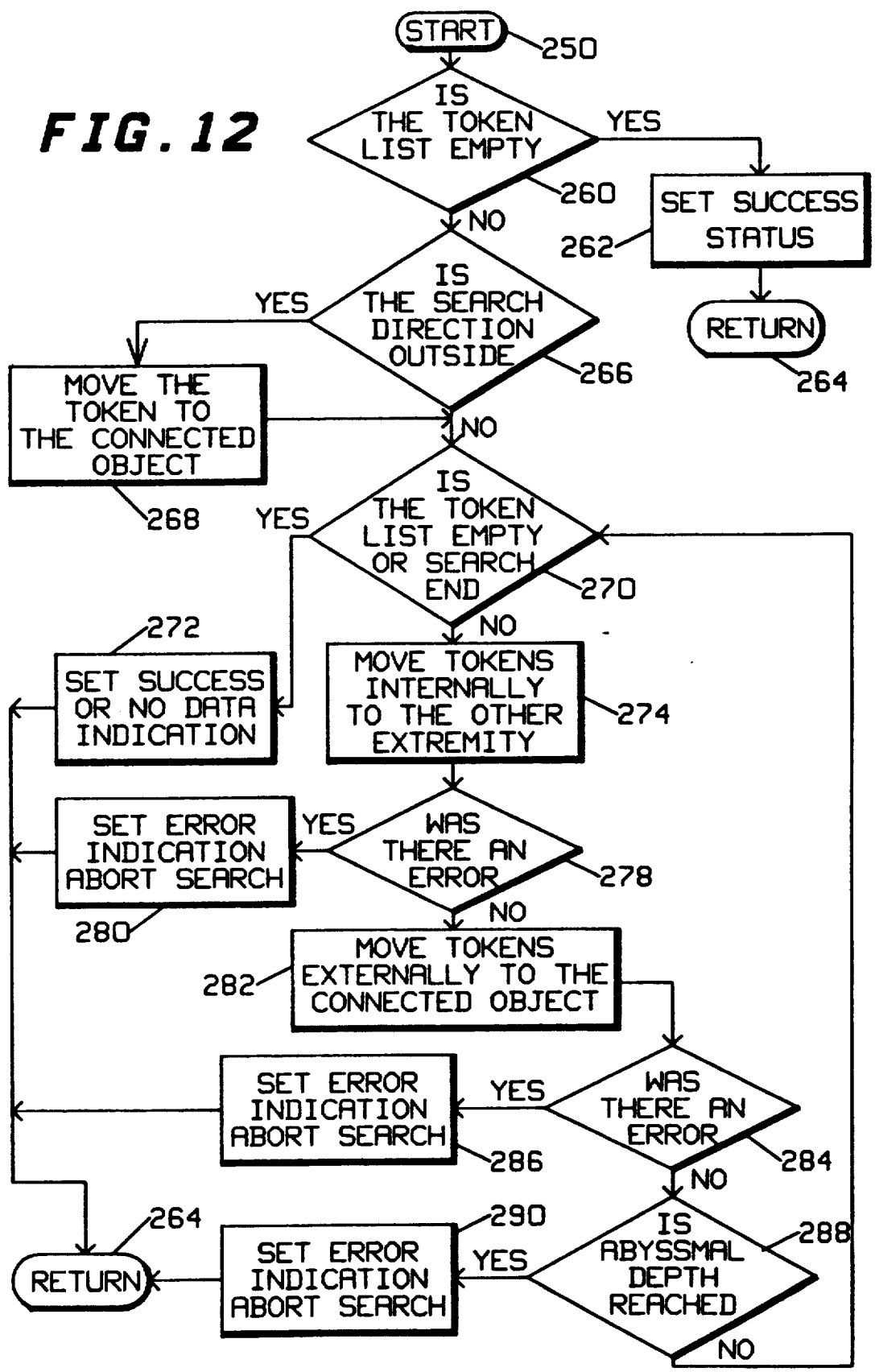
FIG. 12 is a flow chart describing the initial token generation in the present invention.

Turning now to FIG. 12, a flow chart of the token generation process routine of the present invention is shown starting at 250. If the token list is empty, that is there is nothing to search, at 260 the success status is set at 262 and the routine ends at 264. If the token list is not empty at 260, it is determined at 266 if the search direction is outside. If so, control passes to 268 where the token is moved to the connected object. Control then passes to 270. If the search direction is not outside at 266, step 268 is bypassed and control passes directly to 270. At 270 if the token list is empty or the search end is reached by virtue of a search context being met, control passes to 272 where the return status is set to success or a no data indication is produced after which the routine returns at 264. If the token list is not empty or the search end is not reached at 270, the tokens are moved internally to the other extreme at 274. Control is then passed to 278 where an error check is carried out and if an error in internal switching operation is detected, an error indication (flag) is set at 280 after which the routine returns at 264. If no errors are detected at 278, the tokens are moved externally to the connected object at 282. Another error check takes place at 284 after movement of the tokens at 282, and if an error in external connection operation is detected at 284, control passes to 286 where and error indication is set and the search is aborted at 286 followed by return of the routine at 264. If no errors are detected at 284, control passes to 288. At 288, if the abysmal depth is reached, an error indication is set and the search is aborted at 290 and the routine then returns at 264. If the abysmal depth is not reached at 288, control passes back to 270

An abysmal depth is defined for the system as some fixed maximum number of levels that a system is not likely to exceed. For example, a typical system is not likely to exceed 50 levels of depth. The abysmal depth is reached when this number is reached. Since networks may be inadvertently connected in a loop, this feature prevents the search from continuing forever.

Figure 13:
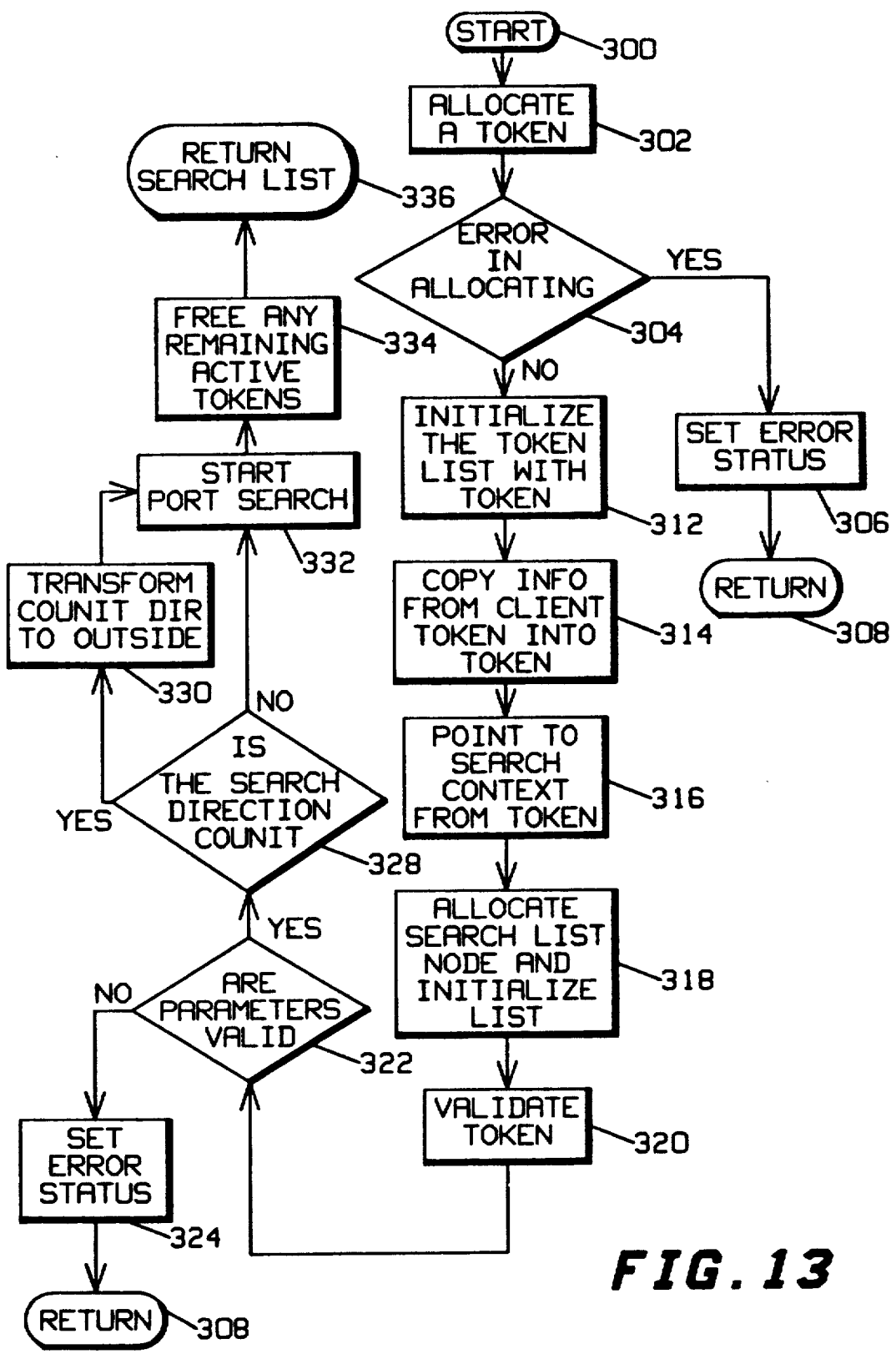
FIG. 13 is a flow chart describing the initiation of a search in the present invention.

Turning now to FIG. 13, a flow chart describing the initiation of a search in the present invention is entered at 300 after which a token is allocated at 302. At 304 an error check determines whether or not an error occurred in allocating the token at 304. If an error occurred, control passes to 306 where the error status is set. The routine then returns at 308. If no error was detected at 304, the token list is initialized with the token at 312. Control then passes to 314 where information from the client token is copied into the token at 314. Control then passes to 316 where the search context is pointed to from the token. Control then passes to 318 where the process allocates a search list node and initializes the list. Then, at 320 the token is validated and control is passed to 322. The validation process of step 320 comprises checking the unit ID and port number to see if they are in an appropriate range, etc.. At 322 the results of the validity check are analyzed and if there is invalidity, control passes to 324 where the error status is set and the routine returns at 308. If the parameters are valid at 322, control passes to 328 where the search direction is checked to determine whether or not the counits are being asked for (counits being children of the same parent). If yes, at 330 the token is moved to the parent and from the parent and the direction is set to outside. Control then passes to 332.

The search direction for any object is with reference to the object itself. If external switchings are explored first, then direction is outside. If internal switchings are explored first then the direction is inside. At 332, the port search is started and control passes to 334. At 334 any remaining active tokens are freed and control passes to 366 where the search list is returned.

Figure 14:
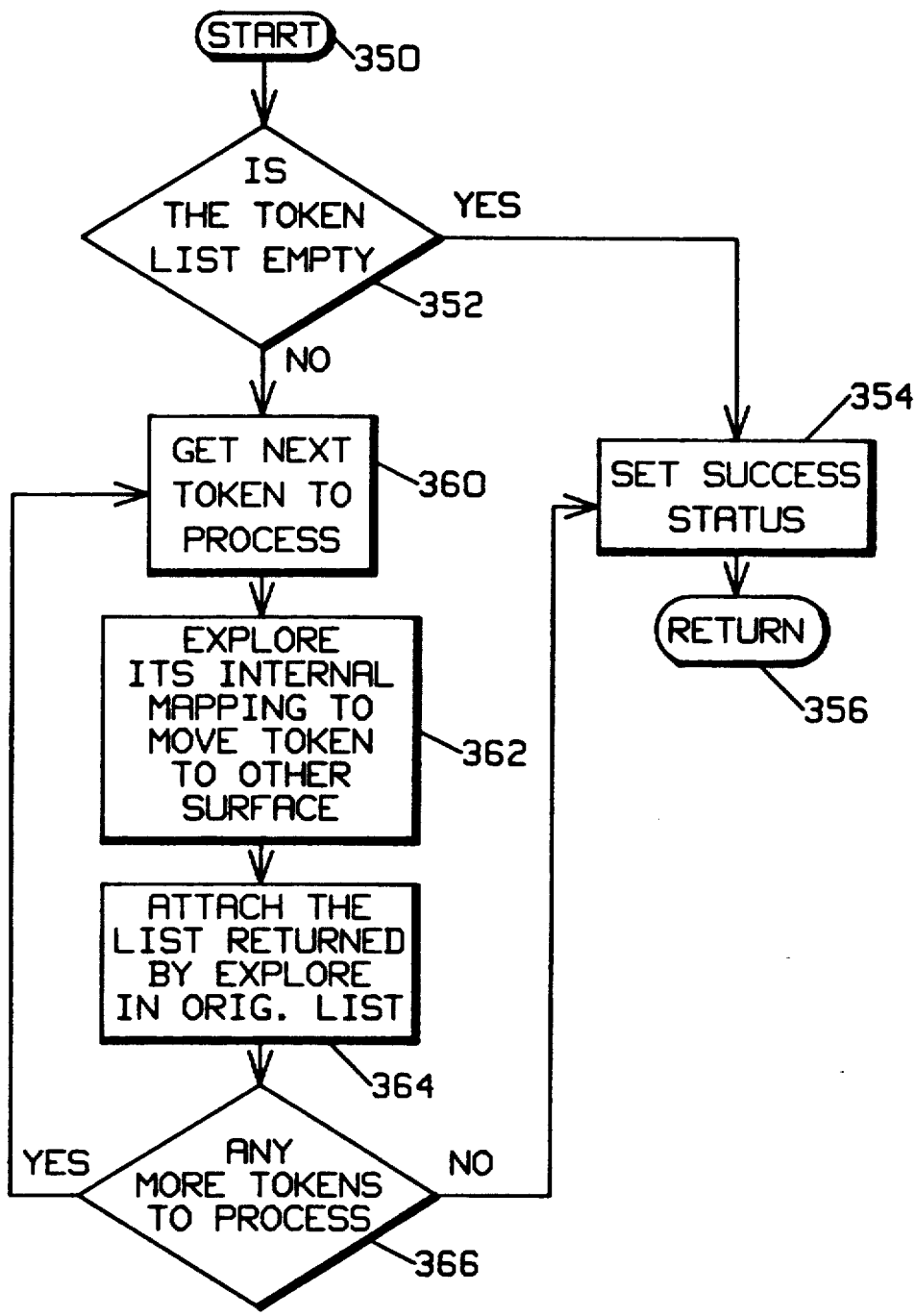
FIG. 14 is a flow chart of the internal mapping list handler of the present invention.

Turning now to FIG. 14, a flow chart of the internal mapping list handler of the present invention starts at 350. If the token list is empty at 352, the success status is set at 354 and the status is returned at 356. If the token list is not empty at 352, control passes to 360 where the next token is fetched for processing. Control then passes to 362 where the internal mapping of the object is explored to move the token to the other surfaces of the object at 362. Control then passes to 364 where the list returned by the EXPLORE routine is attached to the original list. Control then passes to 366 where it is determined whether or not there are more tokens to process. If so, control passes to 360 and if not, control passes to 354.

This procedure explores the internal connection mappings of all currently active tokens. It calls the procedure explore that recursively descends into the object. This procedure transforms the incoming tokens on the search objects into the outgoing tokens. In pseudocode, this procedure may be represented as:

| | |
|---|---|
| INPUT: | incoming tokens |
| OUTPUT: | outgoing tokens |
| CALLS: | explore |
| CALLED BY: | port search (274 of FIG. 12) |
| CONTROL FLOW | |
| procedure internal mapping list handler | |
| for every currently active search token | |
| explore the internal mappings; | |
| attach the list returned by explore in | |
| the place where the curren token was; | |
| end for | |
| end proc | |

Figure 15:
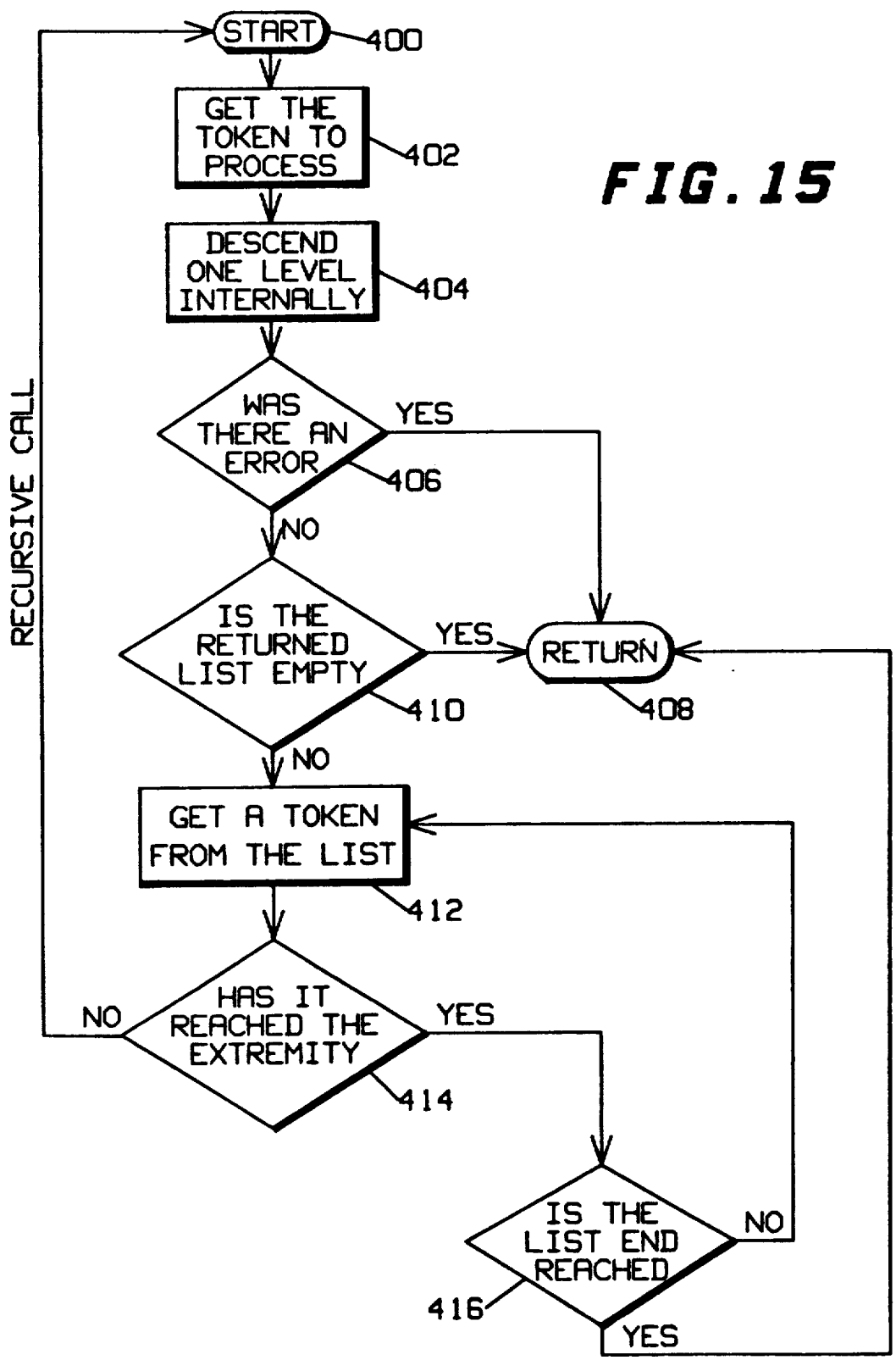
FIG. 15 is a flow chart of the recursive "EXPLORE" routine of the present invention which works on a single token.

Turning now to FIG. 15, which starts at 400 the process for the recursive "EXPLORE" routine is shown. Following step 400, control passes to 402 where the token is fetched for processing. Then, at 404, the token descends one level internally. At 406 an error check is carried out to determine if there was an error. If so, the routine returns at 408. If not, control passes to 410 where the return list is checked to see if it is empty. If it is empty, the process returns to 408. If not, a token is fetched from the list at 412 and control passes to 414. At 414 it is determined whether or not the token has reached the extremity of the object. If not, control passes back to 400 in a recursive call to this routine. If the extremity has been reached at 414 control passes to 416 where it is determined whether or not the end of the list has been reached. If not, control passes back to 412, if so, control passes to 408 where the routine returns.

The EXPLORE procedure explores all the internal mappings of an object. It receives a search token on an external port and transforms it according to the internal switching mappings and generates a list of tokens on the outgoing ports. In pseudocode, the EXPLORE routine may be represented as follows:

```
INPUT:       token to be explored
OUTPUT:      token list of outgoing tokens for the input token
CALLS:       descend
CALLED BY:   internal switching list handler
CONTROL FLOW
procedure EXPLORE
    descend one level with the given token;
    parse through the list of resultant tokens;
    for every token that is still inside the object
        call explore recursively;
        attach the list in place of the token;
    end for
    return the list of tokens;
end proc
```

Figure 16A:
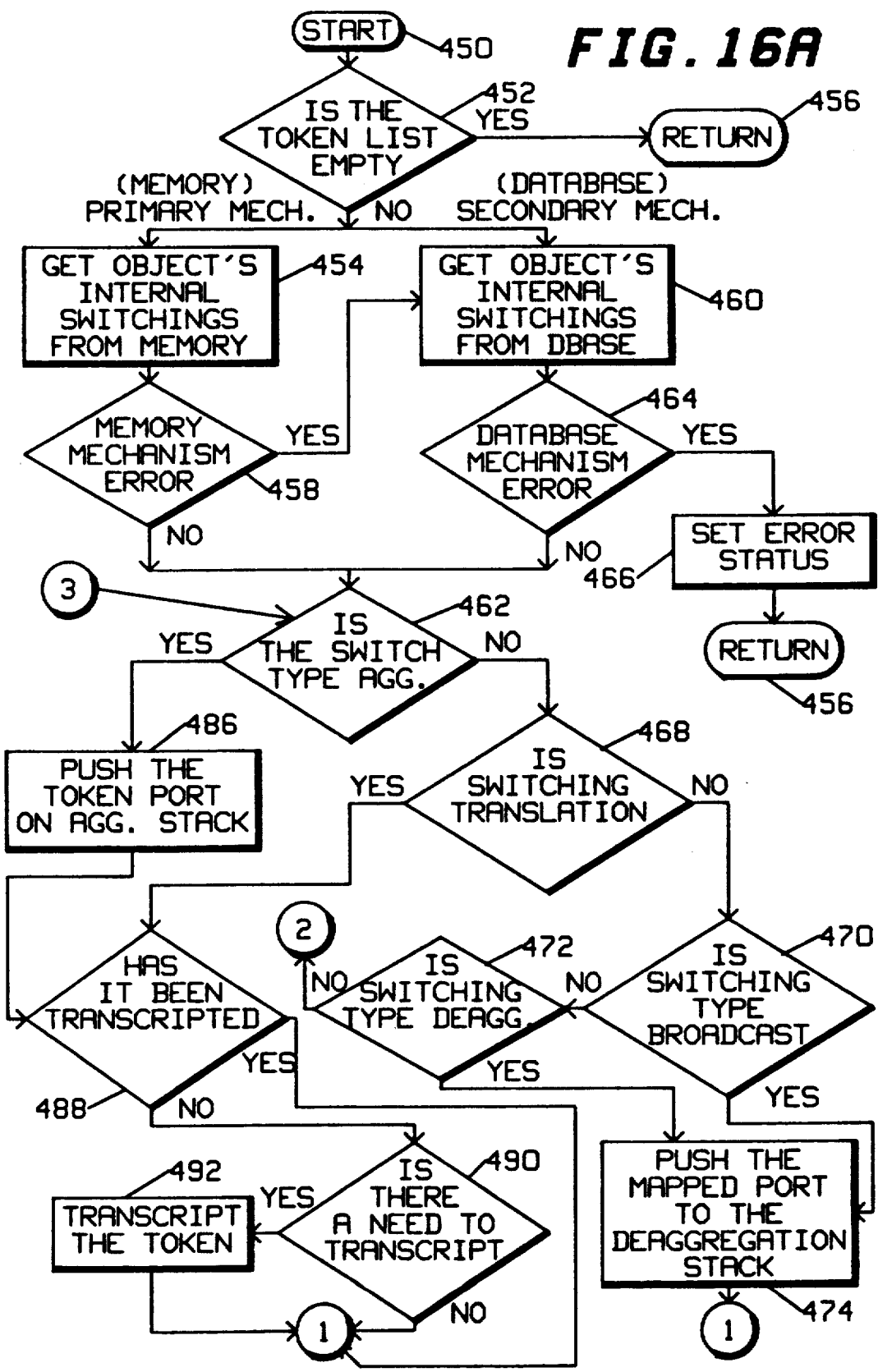
FIG. 16A is the first sheet of a flow chart of the internal switching process of the present invention.
Figure 16B:
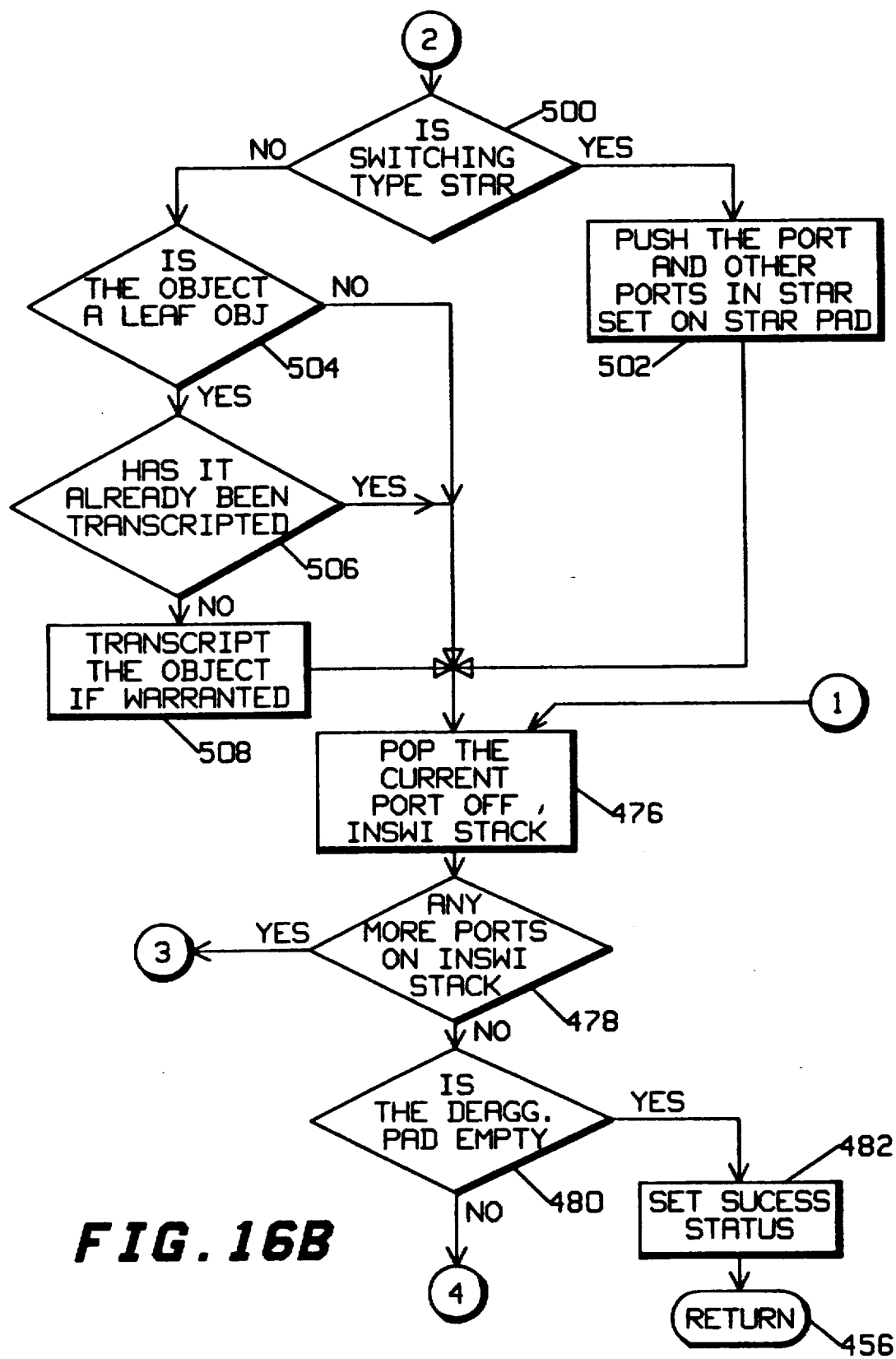
FIG. 16B is the second sheet of a flow chart of the internal switching process of the present invention.
Figure 16C:
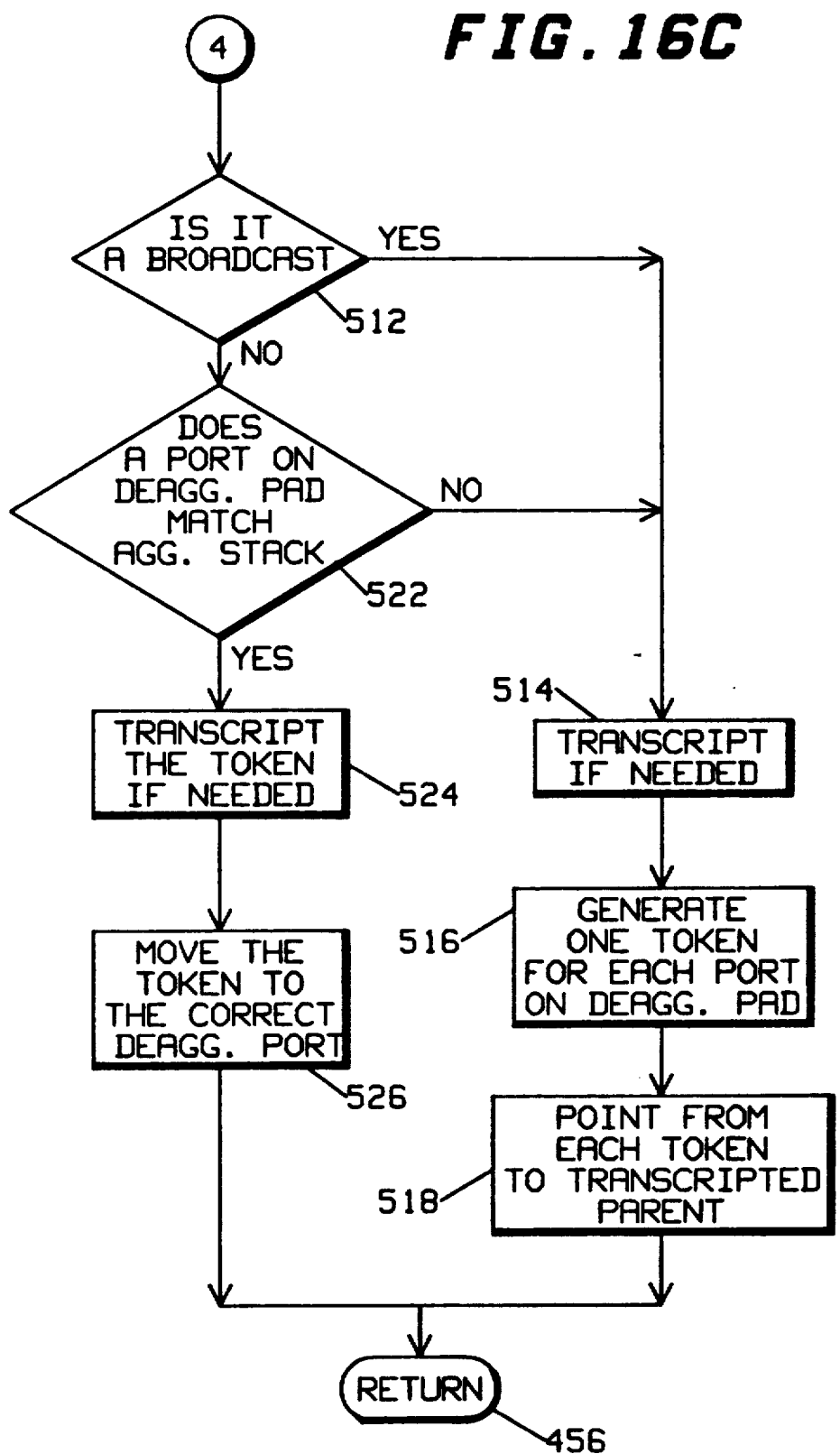
FIG. 16C is the third sheet of a flow chart of the internal switching process of the present invention.

Turning now to FIG. 16, which is divided into FIGS. 16a, 16b and 16c, a flow chart of the internal switching process of the present invention is shown starting at 450. If the token list is empty at 452, the process returns at 456. If the token list is not empty, two possible paths may be taken depending upon whether the process is carried out in memory or using disc storage. If the process is carried out in memory the left most path is followed and at step 454 the object's internal switchings are fetched from memory. The process then moves to 456 where an error check is performed to determine if there was an error in the memory mechanism. If so, control passes to 460 where the object's internal switching are fetched from the database in disc storage. If no memory error occurs at 458, control passes to 462. If the memory is not available or not implemented, control passes from 452 to 460 where the object's internal switchings are fetched from the database. The control then passes to 464 where the database mechanism is tested for errors. If an error occurs, the error status is set at 466 to reflect the error and the routine returns at 456. If no error is detected at 464 control passes to 462. At this point the process proceeds in an identical manner regardless of whether the information was fetched from memory or disc storage.

At 462 the object is tested to determine if it is of the aggregation type. If not, control passes to 468 where the device is tested to determine if it is the switching translation type. If not, then control passes to 470 where the device is tested to find out if it is a broadcast switching type (a deaggregation without a corresponding aggregation). If not, control passes to 472 where the object is tested to determine if it is the switching deaggregation type (the opposite of aggregation). If either the object is a deaggregation type or a broadcast type, control passes to 474 where the mapped port is pushed to the deaggretation stack. Control then passes from 474 to 476 where the current port is popped off the INternal SWItching (INSWI) stack. If no more ports are on the INSWI stack at 478 and the deaggregation pad is empty at 480, a success status flag is set at 482 and the process returns to 456. If more ports are on the INSWI stack at 478, control passes back to 462.

The following pseudocode procedure searches through the internal switching mappings of the object and locates and returns all the port mappings that this port appears in (as in step 454):

```
INPUT:      object, port
OUTPUT:     port mappings
CALLS:
CONTROL FLOW:
procedure
    locate object in the hash table or cache it if not found
    do a linear search in the internal mappings
    for the given port;
        check for multiple mappings;
        return all the port mappings;
end procedure
```

At 462 if the switch is of the aggregation type, the token port is pushed onto the aggregation stack at 486. Control then passes to 488. If the object type is a translation at 468 control also passes to 488. If the token has not been transcripted at 488, and there is a need to transcript the token at 490, control passes to 492 where the token is transcripted. If there is no need to transcript the token at 490, control passes to 476.

If at step 472 the object type is deaggregation, control passes to 500 where it is determined whether the object type is a star. If so, the port and other ports in the star are pushed on the star pad at 502. Control then passes to 476. If the switching type is not a star at 500, control passes to 504 where it is determined whether or not the object is a leaf object. If it is a leaf object at 504 it is determined at 506 whether or not it is already been transcripted. If it has at 506, control passes to 476. If it has not at 506, the object is transcripted at 508 if warranted and control then passes to 476.

If at 480, the deaggregation pad is empty, control passes to 512 where it is determined whether or not the internal switching is of broadcast type (as in flooding). If so, control passes to 514 where it is transcripted if needed. Control then passes to 516 where one token is generated for each port on the deaggretation pad. Control then passes to 518 where each token is pointed to its parent. Control then passes to 456. If it is not a broadcast type at 512, it is determined at 522 whether or not a port on the deaggreation pad matches the aggregate stack. If not, control passes to 514. If so control passes to 524 where the token is transcripted if needed. Control then passes to 526 where the token is moved to the correct deaggregate port. Control then passes to 456.

A pseudocode representation of a routine which descends one level in the internal mapping of the object and then starts from a given port and maps it to the internally connected port is:

```
INPUT:       token to be descended one level
OUTPUT:      token list after descending one level
CALLS:       inswi map (454 of FIG. 16)
CALLED BY:   EXPLORE
CONTROL FLOW:
procedure
    get the internal switching mappings of the token
    for each mapping
        determine the operation type
```

```
                    -continued
        switch on the operation type
        case aggregation:
            push the aggregating port on the aggregation stack;
            replace theport in the token by aggregate port;
        case translation:
            replace the port in the token by translated port;
        case deaggregation:
            accumulate all the deaggregated ports on
            deaggregation stack;
        case star:
            get the star setZ
            push every port in the star set on star stack;
        case leaf:
            leaf object has been reached
            transcript and release the token;
        case non:
            the object does not exist
            release the token;
        end switch
        if aggregation stack has a port on it then
        begin
            try to match it with ports on
            the deaggregation stack;
            if a match is found then
            begin
                generate the resultant token;
                pop the aggregation stack of the token;
                empty the deaggregation stack;
            end
        end
        else
        begin
            this must be a broadcast type
            generte a token for each of the port
            on the deaggregation stack;
        end
        if there are ports on the star stack
        begin
            generate a token for each of the
            star set member;
        end
    return token list;
end proc
```

A pseudocode routine for searching through the internal switching mappings of the object and locating the diagnostic source ports that the object has is:

```
        INPUT:    object
        OUTPUT:   list of diagnostic source ports
        CALLS:
        CONTROL FLOW:
        procedure
            get the object by locating it
                in has structure or by caching it;
            parse through the internal mappings;
            locate the diagnostic source ports
            from the switching map;
            list of diagnostic source ports
        end procedure
```

Figure 17:
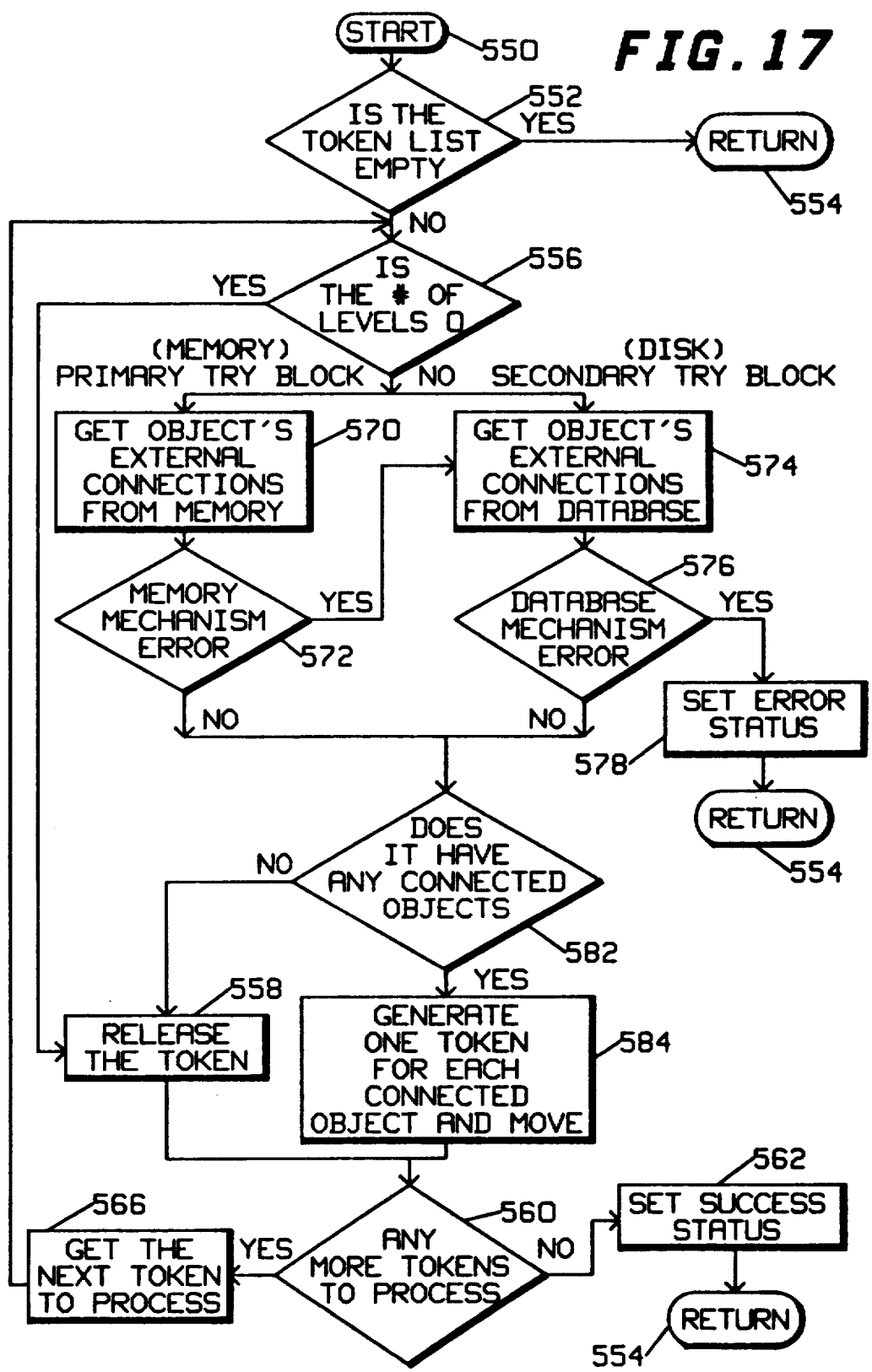
FIG. 17 is a flow chart of the external switching process of the present invention.

Turning now to FIG. 17, flow chart of the external switching process of the present invention is shown starting at 550. At 552 the token list is checked to see if it is empty. If it is empty, control passes to 554 and the routine returns. If not, control passes to 556 where the number of levels is compared to zero. If the number of levels equals zero, control goes to 558 where the token is released and control passes to 560. At step 560 it is determined whether or not there are any more tokens to process and if not control is passes to 562 where the success status is set. The process then returns at 554. If there are more tokens to process at 560 the control passes to 566 where the next token is fetched for processing. The process then moves back 556 if the number of levels is not equal to zero at 556 the process takes two paths depending upon whether or not memory is available or the memory resident target network graph is implemented. Control passes to 570 for the memory search where the object's external connections are fetched from memory. Control then passes to 572 where an error check mechanism determines if there was a memory error. If so, control passes to 574 where the object's external connections are retrieved from the database on disc. Control then passes to 576 where an error check mechanism determines whether or not there was a database error. If so, control passes to 578 where the error status is set followed by return of the routine at 554. If information is to be retrieved directly from disc without attempting to retrieve the connections from memory, control passes from 556 directly to 574. If no errors were detected either at 572 and 576, control passes to 582 where the process determines if the object has any connected objects. If not, control passes to 558. If so, control passes to 584 where one token is generated for each connected object after which control passes to 560.

The procedure described by the flow chart of FIG. 17 explores the external connections of all the currently active tokens. It calls the external connection locator to identify the external connections. This routine may be represented by the following pseudocode:

```
        INPUT:     outgoing tokens
        OUTPUT:    incoming tokens at the connected objects
        CALLS:     routine to move tokens on objects external
                   connections (282 of FIG. 12)
        CALLED BY: port search
        CONTROL FLOW
        procedure external connection list handler
            for every currently active search token
                get the external connecitons;
                for each external connection
                    generate a token at the
                    connected object;
                end for
                attach the token list where
                the original token was;
            end for
        end procedure
```

The following pseudocode procedure searches through the external connections of the given object's given port and returns all the connected objects.

```
        INPUT:     object, external port
        OUTPUT:    external connections
        CALLS:
        CONTROL FLOW:
        procedure get external connections of a single object
        (FIG. 17, 570)
            get the object by locating it
                in the hash structure or by caching it;
            linear search for the given port;
            locate all the external mappings;
            return all of them;
        end procedure
```

In the preferred embodiment, a scheme for building, maintaining, and using the memory resident model is used. This memory management scheme uses a memory resident structure built on a demand basis as opposed to building it a priori. A search superstructure provides for efficient location of objects in the network using internal unit ID as the key. Mechanisms to use the memory resident information as opposed to database table based information are designed to cause minimal changes to the routing manager structure.

The object network at a node may consist of several thousand objects and locating an object may take considerable time if the search procedure is not structured properly. A search superstructure must be maintained in the memory to efficiently locate the object. A balanced binary tree Knuth, Donald, Sorting and Searching, Vol. 3., Addison Wesley 1973, provides for object location in log(n) time in a tree with n nodes. Furthermore, the balanced binary tree entails an overhead of two pointers.

Figure 18:
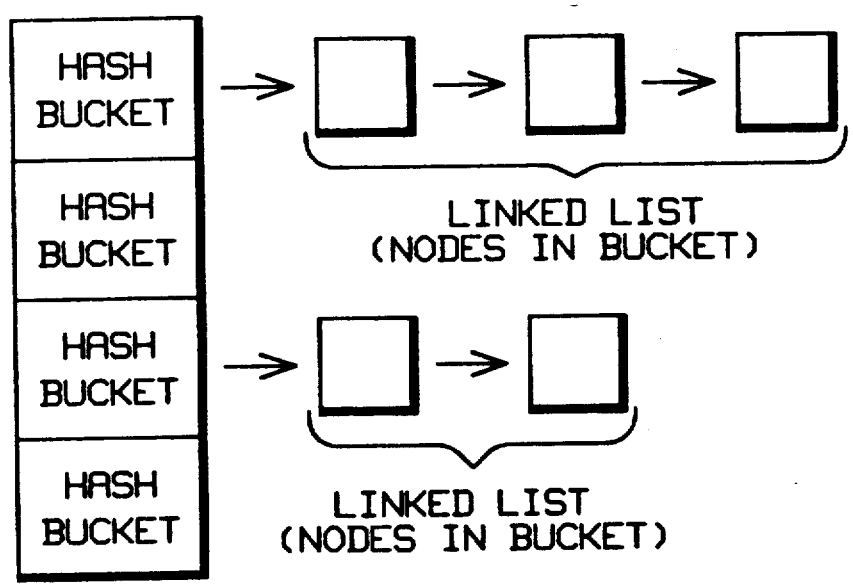
FIG. 18 illustrates the memory hashing scheme of the preferred embodiment.

The preferred embodiment uses hashing for efficient object location. The hash table used is illustrated in FIG. 18. Hashing, as compared to the binary tree, provides much faster object location. It avoids the expensive balancing operation that is needed for the balanced binary tree when objects are added and deleted. Also the hashing implementation would need only one pointer instead of two required by the binary tree implementation, thus resulting in a memory saving.

The hash table is allocated at the initialization time. The size of the hash table is commensurate with the number of units in the database tables. Some room for expansion is also provided to accommodate unit additions. A certain minimum size hash table will be allocated in case the database does not have enough units. This minimum hash table size is obtained from a mechanism that will be defined in the future as a part of the system tunable parameters. This parameter would depend upon the number of units that the system configuration is expected to support.

Open hashing is used because it does not impose a limit on the maximum number of objects that can be accommodated. The hash function employed here is the classical modulo. The modulo function maps the infinite ring of integers Z into a finite ring called the quotient ring Z(q), where q is the divisor used in the modulo function. The quotient ring is the set of integers {0,1,2, ...,q−1}. Two elements of Z, a and b that map into the same element of Z(q) are called congruent modulo q, and then there exists some integer m such that a=b+mq. If q is chosen to be a prime integer then the quotient ring becomes an even more powerful algebraic structure called Galois Field GF(q). function. It is expected that this would generate fairly random allocation of objects into the hash buckets given the fact that the internal ID generation scheme generates consecutive integers as internal IDs. FIG. 18 shows a graphical representation of this hashing scheme.

The hash function is used to generate a hash key from the object's internal ID and the object's record is then searched in the linked list of buckets. If the object is not found then a memory fault is recognized and procedures to bring the object into the memory from the database are initiated. These procedures link the newly retrieved object at the end of the hash chain.

The memory resident object structure consists of two parts: a fixed part containing common information about the object and the search superstructure, and a variable length part that contains the connectivity information. The variable part can be either concatenated to the fixed part or can be pointed to by from the fixed part. The approach using the concatenated variable structure will save one pointer and is therefore preferred. The following is the object data structures as defined in the 'C' language.

```
struct object
    {
    INT32 object_id;            /* internal unit ID    */
    struct object hashlink;     /* pointer to next object */
    INT16 num_excons;           /* count of external connections */
    INT16 num_inswis;           /* count of internal switchings */
    INT8 num_access;            /* count of diagnostic accesses */
    INT8 time_to_live;          /* amount of time left to live */
    INT16TYP object_type;       /* object type    */
    INT16 ckt_type;
    } OBJECT;
```

Concatenated to above object structure will be the variable part. The variable part is of the following structure:

```
/* diagnostic access points */
    INT16 port1;        /* diagnostic access port number 1 */
    INT 8 phunid1;      /* physical unit ID associated with it */
    ...
    ...
    ...
    INT16 portn;
    INT8 phunidn;
/* extenal connections */
    INT16 port1;        /* object's first port number */
    INT16 cnct_prt1;    /* connected objects port number */
    INT32 cnct_id1;     /* connected object id */
    ...
    ...
    ...
    INT16 portm;
    INT16 cnct_prtm;
    INT16 cnct_idm;
/* internal switching description */
    ...
    ...
    ...
    INT16 source_port;
    INT16 sink_port;
    INT16 port_characteristics_and_switch_mapping;
    Where INTn stands for an n bit integer.
```

The target network model is built on a demand basis. The parts of the network that are needed are brought in the memory as the searches proceed and force objects to be cached into the memory. This scheme is simple but has a slow response to the first query that brings in the objects into the memory. This would provide for a good response time for applications which are expected to work largely on active channels which would reside in cache.

The existing lower level routines interact with the database to obtain the connectivity information. These routines would now be replaced by corresponding routines to obtain the information from the memory. The memory representation of the network object uses self defining data structures to avoid the waste that would be otherwise incurred if indirection pointers were used. The structure consists of a fixed part and a variable part. The fixed part contains the information for interpreting the variable part. The interpretation information is provided in terms of number of the connection structures and number of diagnostic access points. The mechanisms to walk through the connection structure to quickly locate the desired information are needed. These mechanisms would use the interpretation information to compute the appropriate offsets to close in on the needed information. In the database implementation, this function was performed by the database management system.

The mechanisms to locate a particular data item at an external connection location is as follows: External connections are positioned first in the variable part. Each port record in this part contains the port number, connected port number, and the connected unit id. The port for which the connectivity is sought is located by means of a linear search in the connection list. Those skilled in the art will recognize that other types of search such as binary searches may be used also.

The internal switching operations follow immediately after the external connections and therefore the offset to skip over the external connections must be computed from the num_excons field in the object's fixed part. Within the description of the switching mappings the port desired must be searched linearly. The search token transformation process can keep a pointer to the internal switching mappings of the object and access all the internal switching mappings using it.

The interface mechanisms use the above two mechanisms for providing the needed information to the search routines that successively transform input tokens into output tokens at an object using internal and external connection operations. If the memory resident target network graph is not implemented, database calls may be made for this purpose.

A Least Recently Used Algorithm (LRU) type algorithm is used for memory management. A count of time to live is kept in the memory image of the object. The memory management task sweeps through the objects in the memory resident graph with a frequency specified in the system parameters, and decrements the time to live of all memory resident objects by one. The memory sweep task must run at low priority and is therefore put to sleep if there are more important client requests pending. The frequency at which the check is made for client requests is again specified by system parameters. The size of memory resident target network graph is limited by the system parameter Mem_high_water. Once the memory high water mark is reached, cleanup is undertaken until the size of the object graph is reduced to a low water mark (Mem_low_water). The memory cleanup involves successively removing objects whose time to live has reached zero, followed by those with time to live equal to one, and so on, until the low water mark is reached. A fault recoverable memory allocation is provided for the dynamic structures used by the search algorithms. If the dynamic memory allocation system call fails due to lack of memory, then an object of sufficient size is searched and sacrificed to make the space available for more critical needs of the search algorithms. The object information for the sacrificed object can be obtained from the database by the database mechanism.

It is possible for the two mechanisms to co-exist with some of the functionality being provided by the database mechanisms and some by the memory mechanisms. Options may be provided for choosing the memory mechanism at compile time as well as boot time. The memory mechanism can be turned off at boot time by disabling a system parameter according to the preferred embodiment.

The following is a routine to destroy a given object and delete it from the hash table and associated list so as to deallocate and free the space that was allocated for this object.

```
INPUT:     internal unit ID of the object
OUTPUT:
CALLS:
CONTROL FLOW:
procedure
    free up the object;
    destroy in hash structure with internal unit id;
end proc
```

The following pseudocode routine performs a hashing search using standard library routines. Then the routine performs a linear lookup in the open linked list associated with this hash bucket. It then imposes a sorted order on the link chain and performs a binary search on it.

```
INPUT:     internal unit id of the object
OUTPUT:    pointer to the located object
CALLS:     search
CONTROL FLOW:
procedure
    generate hash key;
    use the key to locate the hash bucket;
    search in the linked list of objects in the bucket;
    if object is found
        then return object
    else
        cache the object;
        return object pointer;
end proc
```

In order to cache a given object from the database, get all internal mappings from the internal switching relation and all of the external connections from the external connection tables; allocate the required amount of memory space using dynamic memory allocation. Move the database information into the allocated space forming the structure with sizes of the variable external and internal connections specified in the data structure definition parts of the fixed header part. In pseudocode, this may be represented as:

```
INPUT:     object
OUTPUT:    pointer to the cached object
CALLS:     create, insert
CONTROL FLOW:
procedure
    get counts of external and internal connections
    as well as all the connection lists for the object
    from database.
    compute the size needed to store the object
    allocate the space required for the object
    fill in the allocated object with information from the database
    make entry in the has table and insert this object in the hash
    linked list.
end procedure
```

The following pseudocode routine dynamically allocates space needed to store an object in memory.

```
INPUT:     size of the object
OUTPUT:    pointer to allocated space
CALLS:
CONTROL FLOW:
procedure
    allocate dynamically the desired space;
    return a pointer to it;
end procedure
```

The mod function has been used to generate the hash key since it provides an almost normal distribution of objects which have consecutive integers as internal IDs. Hash table size will be a fraction more than the number of objects in the system. This will ensure that hash link chain will on the average have only one member. If the internal ID generation algorithm changes then the hash function must be modified to ensure a normal distribution of objects in the hash buckets. Any modification to the object will cause the deletion of the object from the memory resident graph. There is no provision for changing the object representation in the memory. If the modifications are frequent then mechanisms to repair the memory resident object must be developed to provide a better performance.

The memory mechanism is utilized to overcome unacceptably slow performance of the database mechanism. This, however, has a higher first time delay because the memory resident structures must be constructed in addition to retrieving information from the database. This first time delay will be mostly seen by the alarm state reconstruction process, providing a fast response to the applications which will find the needed information already cached in memory. This scheme is considerably simpler and does not have complicated initialization mechanisms needed by the alternate approach. A hashing scheme is used for locating objects and binary search is used for locating the needed information within the object. The routing manager structure provides for a phased change over to the memory implementation during development and a conditional compilation at the manufacturing time to build the routing with either the database or the memory mechanism depending on the customer requirements.

Figures 19A, 19B:
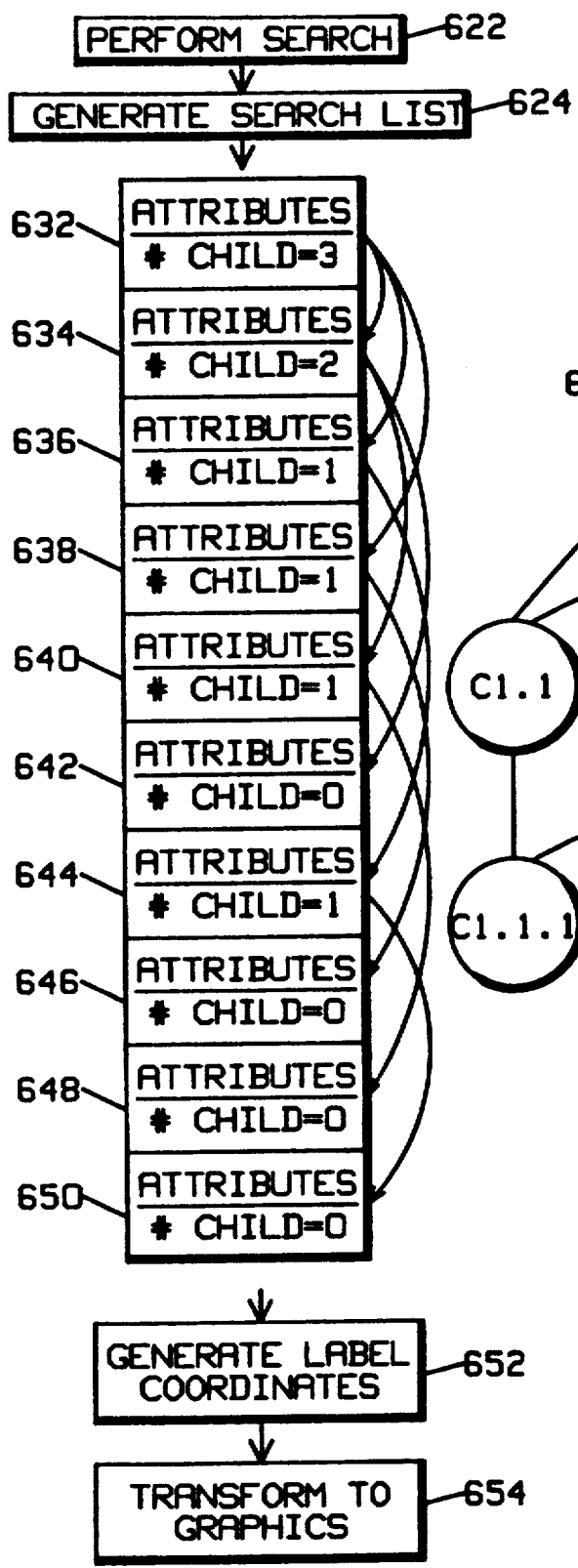
FIG. 19A illustrates the search list representation of the network.
FIG. 19B illustrates the graphical representation of the network corresponding to the search list representation.

Turning now to FIG. 19, structure of a search list and its relationship with the search results is shown. The search results are represented generally as network 600. This example network includes a root object 602 representing the object where the search started. The root object 602 has three 'children' C1, C2 and C3 designated 604,606 and 608 respectively. Child 604 has two children C1.1 and C1.2 designated 610 and 612 respectively. Child C1.1 has one child C1.1.1 designated 614 while child C1.2 has no children. Child 606 has one child C2.1 labeled 616 who in turn has one child C2.1.1 labeled 618. Child C3 has one child C3.1 designated 620.

When the network is searched, as represented by 622, the results of the search are stored in the form of a search list generated at 624. Each record of the search list may be represent as a group of attributes (such as type of object, ID number, etc.) plus the number of children associated with that object). The illustrated configuration represents a breadth first traversal, but those skilled in the art will recognize that a depth first oriented list may also be possible.

Record 632 represents the root object 602 with its three children (604, 606, and 608) noted. The next three records represent the three children with record 634 describing object 604, record 636 describing object 606 and record 638 describing object 608. Records 640 and 642 represent objects 610 and 612 respectively. Record 644 represents object 616 and Record 646 represents object 620. Record 648 represents object 614 and Record 650 represents object 618. The records may allow space for in place addition of information to facilitate graphical representation or a separate set of information may be created.

Once the search list has been generated, each object may be provided with a label at 652 according to it's position in the network resulting from the search. This labeling system may, for example, be similar to the "C" labels of 600. In this system, each child's label is its parent's label with another number appended to it, thus tracing the child back to the root. Thus, child C2.1.1 can be traced back to C2.1 to C2 to the root. This scheme has advantages in that it provides information not only about the path back to the root, but also provides an order for the graphical representation (C1 is left of C2, etc.). With this information available, the search list may be turned into a graphics representation by a graphics generator at 654.

Figure 20:
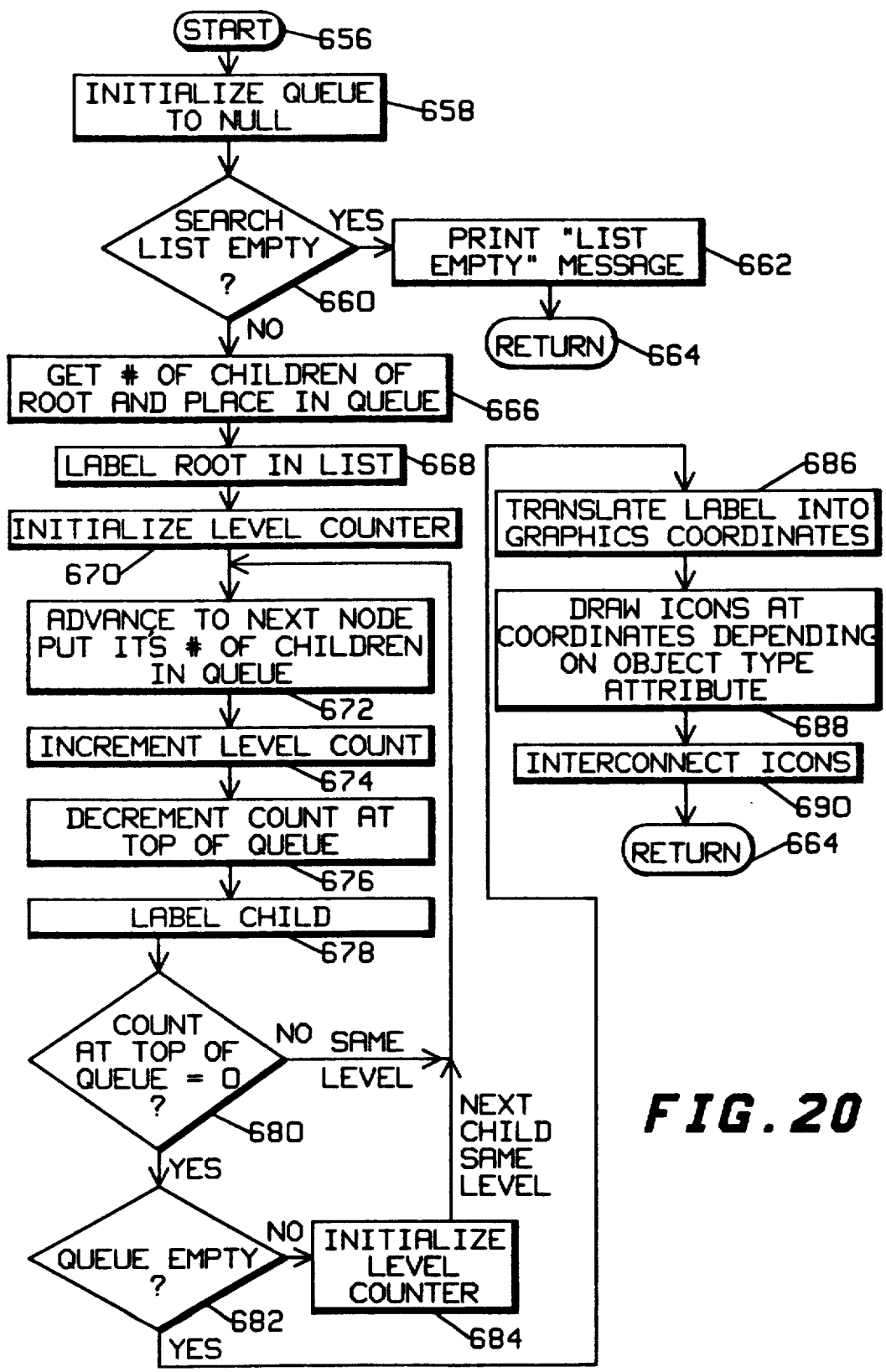
FIG. 20 is a flow chart for the process of converting the search list information into a graphical representation.

Turning now to FIG. 20, the process for generating the graphical representation is described starting at 656. At 660 the search list is checked and if it is empty, a search list empty message is printed at 662 and the process ends at 664. If the search list is not empty the number of children of the root (first) record is fetched and placed in a queue at 666. The root record is then labeled as described above and the label is added in place (or in a separate list) to the search list at 668. At 670, a label counter is initialized and the process advances to the next node (next record) at 672 and its number of children is placed in queue. The level counter (which maintains the level with respect to the current parent as opposed to an absolute level) is incremented at 674 and the count at the top of the queue is decremented at 676. The child is then labeled at 678 and control passes to 680. At 680 the count at the top of the queue is inspected. If it is not zero then there are more children at the same level and control passes back to 672. If it is zero, control passes to 682 where the queue is inspected. If the queue is not empty, the level counter is initialized at 684 and control passes back to 672 where the next child on the same level is processed.

When the queue is empty at 682, control passes to 686 where the labels are translated into graphics coordinates. The labeling system allows the translation to readily determine the number of children at each level and assign coordinates to them in a manner which appropriately distributes them across the display. In some instances, the search list is too large to be viewed in one display. In these instances, known zooming and paging techniques may be used to isolate portions of the picture for clear display.

These coordinates are used by step 688. In this step, icons representing each type of object or node as described by its attribute are drawn at the assigned coordinates. Different icons may be used to represent different types of objects such as modems, multiplexers, etc. Different colors may also be used to enhance the visual representation. At step 690, the icons are interconnected with lines (or arrows, etc. as appropriate) to represent the interrelationship of the objects. Those skilled in the art will appreciate that steps 688 and 690 may be performed in a looping manner if desired so that icons are first drawn followed by the interconnection lines for that icon followed by more icons, and so on. At step 664, the process ends.

Figure 4A:
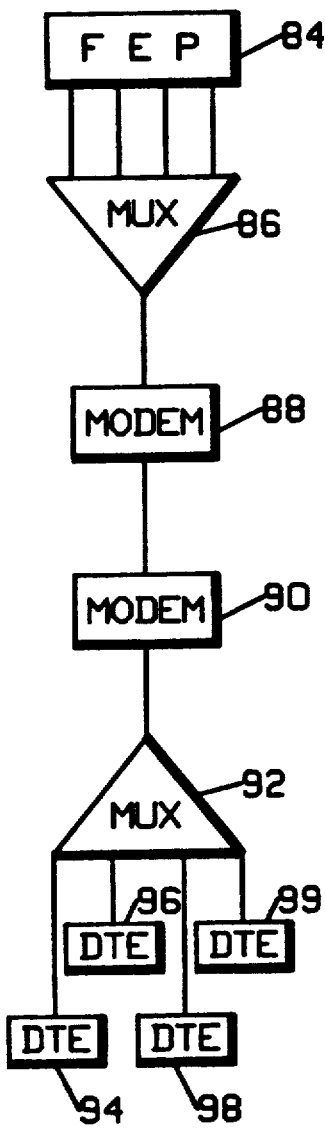
FIG. 4A shows an example data communication network.
Figure 4B:
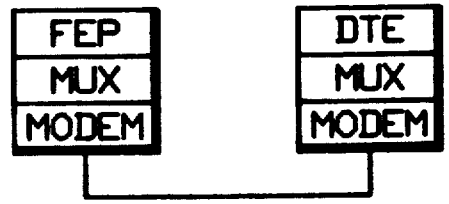
FIG. 4B shows a first OSI abstraction of the network of FIG. 4A.
Figure 4C:
FIG. 4C shows a second OSI abstraction of the network of FIG. 4A.
Figure 4D:
FIG. 4D shows a third OSI abstraction of the network of FIG. 4A.
Figure 4E:
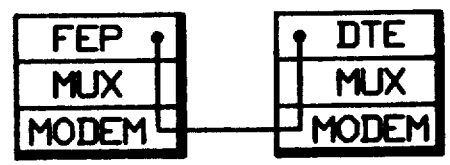
FIG. 4E shows a fourth OSI abstraction of the network of FIG. 4A.
Figure 5A:
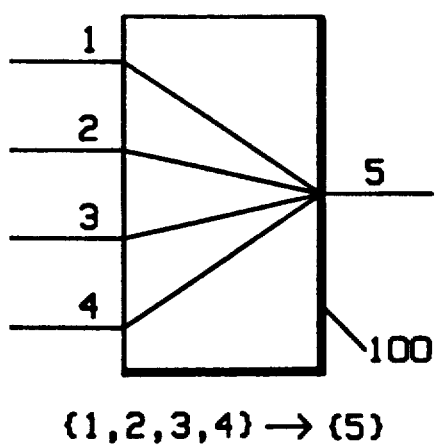
FIG. 5A shows an aggregation device model.
Figure 5B:
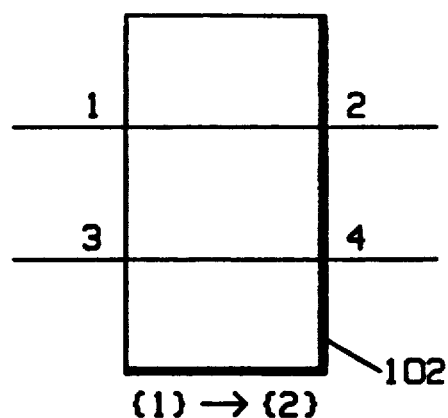
FIG. 5B shows a translation device model.
Figure 5C:
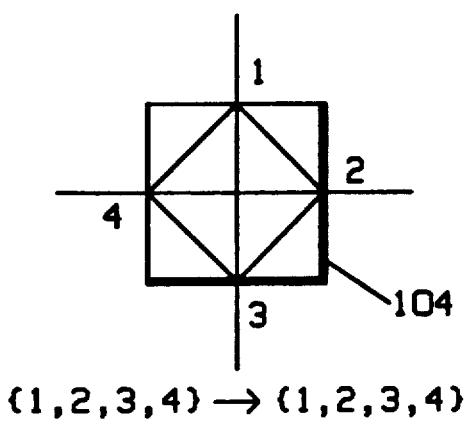
FIG. 5C shows a mesh or star device model.
Figure 5D:
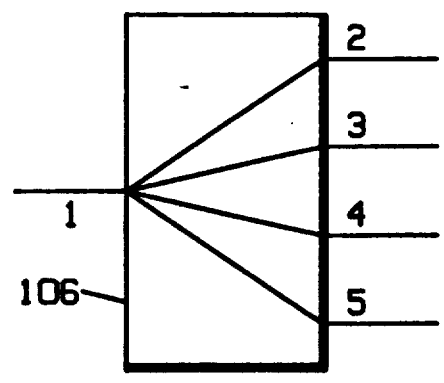
FIG. 5D shows a deaggregation device model.
Figure 5E:
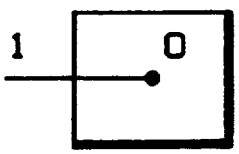
FIG. 5E shows a termination device model.
Figure 5F:
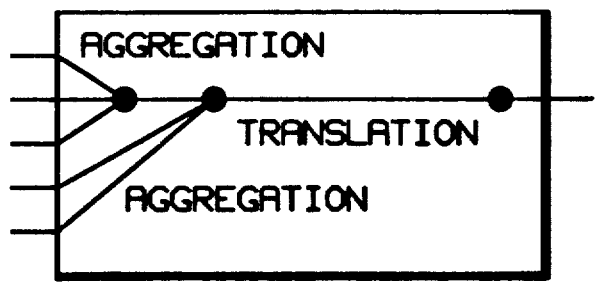
FIG. 5F shows an example of two aggregations and one translation used to build a more complex model.
Figure 21C:
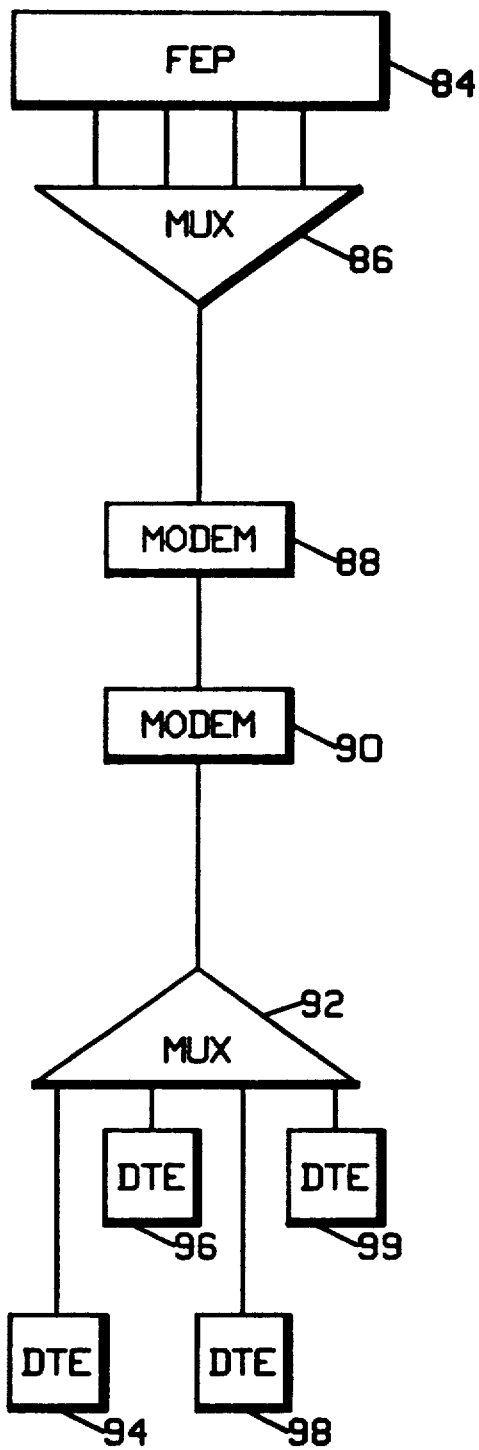
FIG. 21C shows a third abstraction of the network of FIG. 4.
Figure 21D:
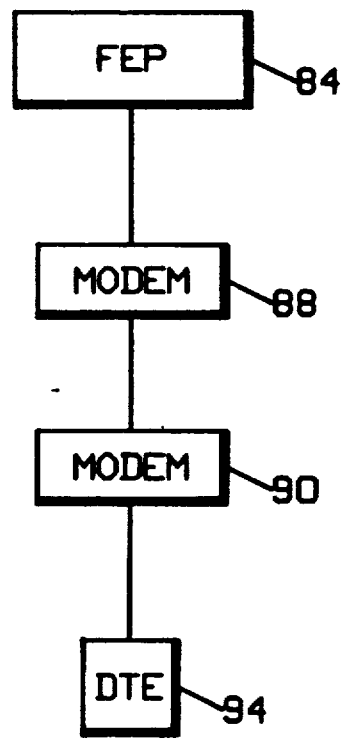
FIG. 21D illustrates a fourth abstraction of the network of FIG. 4.

Turning now to FIG. 21, various network abstractions are presented for the network shown in FIG. 4a. FIG. 21a is analogous to the view of FIG. 4c wherein only the FED to DTE communication is shown. FIG. 21b is analogous to FIG. 4d wherein the multiplexers are included in the view. FIG. 4c includes all nodes between the FEP and the DTEs as in FIG. 4b. In FIG. 21d another abstraction of the network which includes only modems is shown. Those skilled in the art will appreciate that numerous other types of views are possible by suitably tayloring the search criterion.

Once a search has produced a route through the system according to the search criterion, several possible uses can be made of the route. For example, the previously described process of drawing a graphical representation of the network from a perspective dictated by the search criterion. Unit to unit communication links may also be established using the path selected by the search. The route may also be utilized for resource allocation, that is, a path can be checked out to determine its suitability for a particular purpose prior to allocation of the resource. In this regard, the search could be used to determine, for example, if there is a loopback test in progress in the path under scrutiny.

The search process may also be the result of a backward mapping of alarms produced on a diagnostic channel. Since some diagnostic systems use a limited number of diagnostic addresses for nodes, it may be required to find a device producing a MAYDAY by a search so that it can be positively identified by information stored in the database which the node is too primitive to disclose on its own.

Another application of the search is to determine which of a number of nodes are associated with one another in some way (group objects). Other uses will occur to those skilled in the art.

Figure 22:
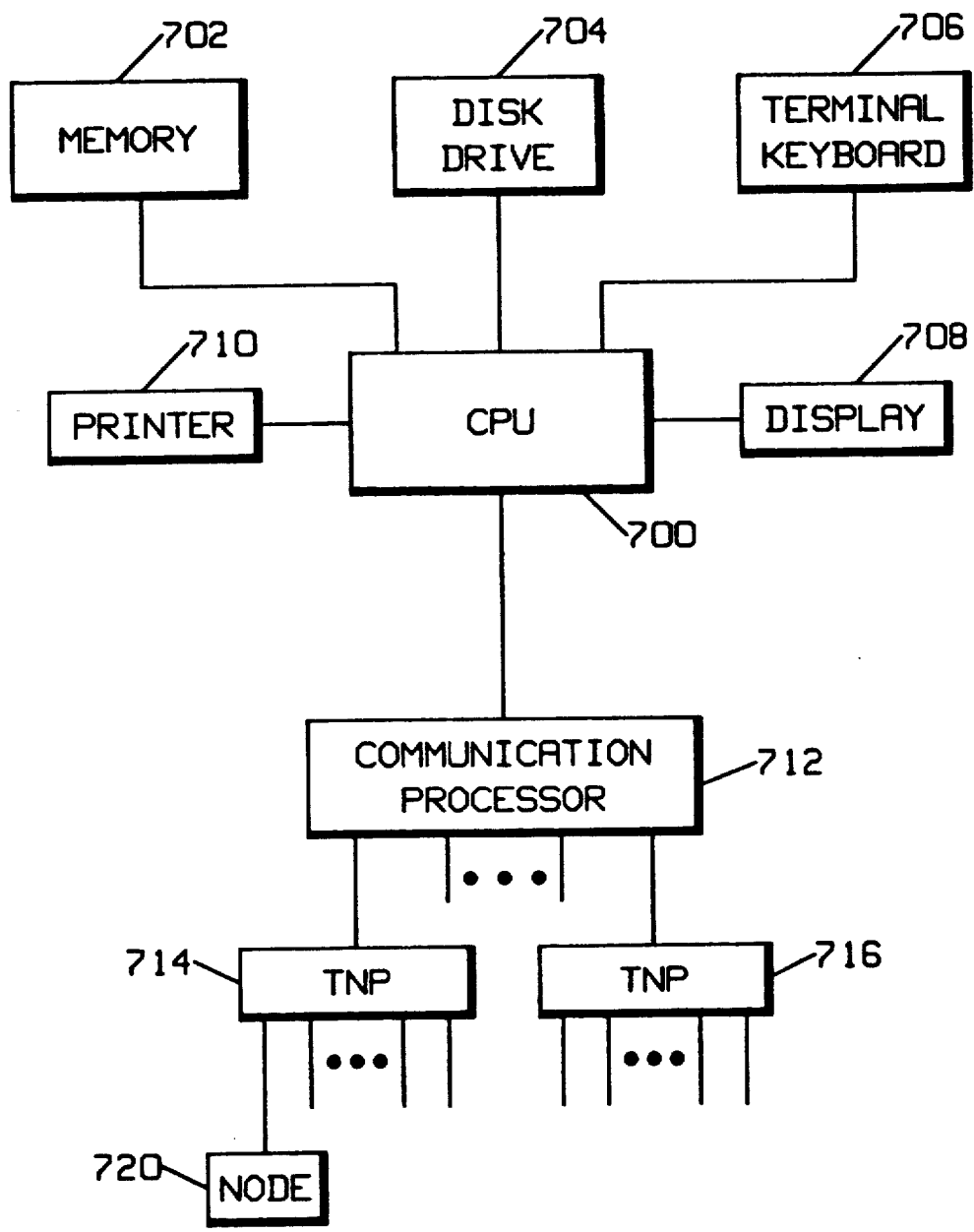
FIG. 22 is a hardware block diagram of the host utilized for the present invention.

Turning now to FIG. 22, a hardware overview of host utilized in implementation of the present invention. Such hardware is commercially available from a number of manufacturers and may, in one embodiment be based upon a Digital Equipment Corp. Microvax ™ 2000 or 3600 computer running the ULTREX ™ operating system. In other embodiments, workstations such as those manufactured by IBM ® or SUN ® may potentially be utilized. The system includes a central processor (CPU) 700 with associated memory 702, storage such as disk drives 704, keyboard 706 for user entry 706, and display 708. A printer 710 or other device for producing a hard copy may also be used with the system. A communication processor 712 provides an interface between the host computer and the network via its connection to target network processors such as 714 and 716. The TNP's are interfaced to the other nodes of the network. The TNPs and CPs may also be modeled as nodes.

The present invention thus provides a generic representation of a time varying network. A generic representation of the time varying nodes is also provided. The search algorithm is independent of the node type and network type, being equally applicable to solve various network-connectivity oriented problems. Dynamic changes to the network have a local effect, rather than a rippled effect. The unique data structure representation of any device is also presented. The model of the present invention can be used to represent a network of multiply connected communication devices referred to here as objects. A general representation called generalized object is capable of modeling modems, multiplexers, switches, concentrators, nodes etc. in an uniform manner.

A model for connectivity of these objects together with the search algorithm allows the user to obtain routes and views of the connectivity of the network. The search algorithm is capable of tracing logical connection pathways referred to here as channels in an efficient manner by pruning the undesired pathways.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A computer implemented method for providing a response to a query of a relational database having a plurality of entries describing a model of a communication network, said model of said communication network comprising a plurality of elements which are interconnected by a plurality communication links, said plurality of elements being located at a plurality of nodes in said communication network, said plurality of elements including at least two types of elements selected from a set of types of elements consisting of a modem element, a multiplexer element and Digital Service Unit element, said method comprising the steps of:

first, searching said database for said entries which satisfy a search criterion, said search criterion including the criterion of selection of only said entries representative of a predetermined one of said types of elements;

said first step of searching through said database including the further ordered steps of:
a) generating a token including said search criterion;
b) placing said token on an incoming port of first one of said elements having at least one incoming port and at least one outgoing port;
c) determining whether said first element has characteristics which satisfy said search criterion;
d) transforming said token to said outgoing port of said first element in accordance with a stored internal switch mapping which describes how said at least one incoming port of said first element is mapped to said at least one outgoing port of said first element;
e) moving said token to an externally connected second one of said elements using a stored external connection mapping which describes how said first element is interconnected with said second element; and
d) recording a list of the elements traversed as by the above steps which satisfy said search criterion;

second, ascertaining a structural interrelationship between said entries which satisfy said search criterion; and third, generating a graphical representation of said structural interrelationship between said entries which satisfy said search criterion, whereby said graphical representation of said communication network includes only said predetermined one of said types of elements.

2. The method of claim 1, wherein said second step of ascertaining includes the further step of storing said graphical representation of said interrelationship in a computer memory.

3. The method of claim 1, wherein said third step of generating further comprising the step of determining which of a predetermined plurality of graphical symbols best represents each of said entries of said database.

4. The method of claim 3, further comprising the step of displaying said graphical representation of said structural interrelationship on a computer display with said graphical symbols interconnected to represent said structural interrelationship of said entries after said third step.

5. The method of claim 1, wherein said database entries include information about said elements of said communication network.

6. The method of claim 1, wherein said model is stored in a memory resident model.

7. The method of claim 6, wherein said first step further comprises the step of searching through a secondary storage medium to find said entries in the event searching through said memory resident model fails to contain needed information.

8. The method of claim 7, wherein said secondary storage medium stores a database containing relationships of said elements in said model.

9. An apparatus for displaying a graphical representation of a selected portion of information from a database describing a communication network, said network comprising a plurality of elements interconnected by communication links, said plurality of elements being located at a plurality of nodes in said communication network, said plurality of elements including at least two types of elements selected from a set of types of elements consisting of a modem element, a multiplexer element and Digital Service Unit element, comprising in combination:

searching means for searching said database for entries which satisfy a search criterion, said search criterion including the criterion of selection of only a predetermined one of said types of elements of said communication network, so that said graphical representation of said communication network includes only said predetermined type of element;

said searching means further including:
a) means for generating a token including said search criterion;
b) means for placing said token on an incoming port of first one of said elements having at least one incoming port and at least one outgoing port;
c) means for determining whether said first element has characteristics which satisfy said search criterion;
d) means for transforming said token to said outgoing port of said first element in accordance with a stored internal switch map which describes how said at least one incoming port of said first element is mapped to said at least one outgoing port of said first element;
e) means for moving said token to an externally connected second one of said elements using a stored external connection map which describes how said first element is interconnected with said second element; and
d) means for recording a list of the elements traversed by said searching means which satisfy said search criterion;

ascertaining means, receiving said entries from said searching means, for ascertaining a structural interrelationship between said entries which satisfy said search criterion; and generating means, responsive to said ascertaining means, for generating a graphical representation of said interrelationship between said entries which satisfy said search criterion.

10. The apparatus of claim 9, wherein said searching means conducts a search of a memory resident model.

11. The apparatus of claim 10, wherein said searching means conducts a search of a database in the event said memory resident model does not contain enough information to satisfy said search criterion.

* * * * *